US010006799B2

(12) United States Patent
Hanson et al.

(10) Patent No.: US 10,006,799 B2
(45) Date of Patent: *Jun. 26, 2018

(54) SYSTEM AND METHOD FOR MEASURING MOVING VEHICLE INFORMATION USING ELECTRICAL TIME DOMAIN REFLECTOMETRY

(71) Applicant: INTERNATIONAL ROAD DYNAMICS, INC., Saskatoon, Saskatchewan (CA)

(72) Inventors: Randal Leroy Hanson, Saskatchewan (CA); Michael David Lockerbie, Saskatchewan (CA); Ian Robert Meier, Saskatchewan (CA); Tyler William Haichert, Saskatchewan (CA)

(73) Assignee: INTERNATIONAL ROAD DYNAMICS INC., Saskatoon (CA)

( * ) Notice: Subject to any disclaimer, the term of this patent is extended or adjusted under 35 U.S.C. 154(b) by 268 days.

This patent is subject to a terminal disclaimer.

(21) Appl. No.: 14/772,717

(22) PCT Filed: Mar. 3, 2014

(86) PCT No.: PCT/IB2014/059406
§ 371 (c)(1),
(2) Date: Sep. 3, 2015

(87) PCT Pub. No.: WO2014/136037
PCT Pub. Date: Sep. 12, 2014

(65) Prior Publication Data
US 2016/0019731 A1 Jan. 21, 2016

Related U.S. Application Data

(63) Continuation-in-part of application No. 13/825,797, filed on Mar. 15, 2013, now Pat. No. 9,429,463.
(Continued)

(51) Int. Cl.
*G01G 19/02* (2006.01)

(52) U.S. Cl.
CPC .................. *G01G 19/024* (2013.01)

(58) Field of Classification Search
CPC ................................... H05B 41/2822
See application file for complete search history.

(56) References Cited

U.S. PATENT DOCUMENTS 3,782,486 A * 1/1974 Kuhn ................ G01G 7/06
177/210 R
4,560,016 A * 12/1985 Ibanez ................ G01G 19/03
177/132
(Continued)

FOREIGN PATENT DOCUMENTS

CA 2163045 5/1997
CN 201000356 1/2008
(Continued)

OTHER PUBLICATIONS

International Search Report for PCT/IB2014/059406 dated Jul. 2, 2014, three (3) pages.
(Continued)

*Primary Examiner* — Thomas G Black
*Assistant Examiner* — Ana D Thomas
(74) *Attorney, Agent, or Firm* — Nixon & Vanderhye PC

(57) ABSTRACT

Systems, apparatus and methods are provided for measuring moving vehicle information. Moving vehicle information may be measured by a sensor configured to respond to one or more wheels of the moving vehicle, where one or more of the wheels change the characteristic impedance of the sensor at the wheel's contact location. An electrical time domain reflectometry signal processing system which is capable of measuring the change in the impedance of the sensor and converting the impedance change to a signal may be connected operatively to the sensor. A data-processing system receives the signal and extracts the moving vehicle information therefrom.

15 Claims, 17 Drawing Sheets

Related U.S. Application Data

(60) Provisional application No. 61/772,138, filed on Mar. 4, 2013.

(56) References Cited

U.S. PATENT DOCUMENTS

| | | | | |
|---|---|---|---|---|
| 4,712,423 | A * | 12/1987 | Siffert | G01G 19/024 177/132 |
| 4,799,381 | A * | 1/1989 | Tromp | G01G 19/024 177/211 |
| 4,984,128 | A * | 1/1991 | Cebon | G01G 7/06 177/210 C |
| 5,111,897 | A * | 5/1992 | Snyder | G01P 3/64 177/1 |
| 5,260,520 | A * | 11/1993 | Muhs | G01G 19/03 177/1 |
| 5,265,481 | A * | 11/1993 | Sonderegger | G01G 3/13 177/210 C |
| 5,448,222 | A * | 9/1995 | Harman | G08B 13/169 340/566 |
| 5,461,924 | A * | 10/1995 | Calderara | G01G 3/13 73/768 |
| 5,520,056 | A * | 5/1996 | Buisson | E01F 11/00 340/933 |
| 5,585,604 | A * | 12/1996 | Holm | G01G 11/00 177/1 |
| 5,693,886 | A * | 12/1997 | Seimiya | G01L 1/142 73/718 |
| 5,705,984 | A * | 1/1998 | Wilson | G08B 13/169 340/552 |
| 5,710,558 | A * | 1/1998 | Gibson | G08G 1/02 200/85 R |
| 5,900,592 | A * | 5/1999 | Sohns | G01G 7/06 177/210 C |
| 5,998,741 | A * | 12/1999 | Besheers | G08G 1/015 177/133 |
| 6,459,050 | B1 | 10/2002 | Muhs | G01G 19/022 177/133 |
| 6,526,834 | B1 * | 3/2003 | Kohler | G01G 3/13 73/777 |
| 6,646,451 | B2 * | 11/2003 | Lanan | G01R 27/04 324/528 |
| 6,692,567 | B1 * | 2/2004 | Tatom | G01G 19/024 117/1 |
| 6,865,518 | B2 * | 3/2005 | Bertrand | G08G 1/042 702/187 |
| 6,894,233 | B2 * | 5/2005 | Dingwall | G07B 15/00 177/210 C |
| 7,072,763 | B2 * | 7/2006 | Saxon | G01G 19/086 177/136 |
| 7,153,383 | B2 * | 12/2006 | Gebert | G01G 7/06 156/249 |
| 7,375,293 | B2 | 5/2008 | Besheers | |
| 7,421,910 | B2 | 9/2008 | Chen et al. | |
| 7,532,011 | B2 * | 5/2009 | Shi | G01R 31/11 324/533 |
| 7,783,450 | B2 * | 8/2010 | Hively | G01G 19/035 177/132 |
| 8,161,089 | B1 * | 4/2012 | Mody | H04L 27/0006 708/200 |
| 9,002,291 | B2 * | 4/2015 | Xu | H04B 17/103 455/67.11 |
| 9,279,712 | B2 * | 3/2016 | Kroll | G01G 3/14 |
| 9,304,032 | B2 * | 4/2016 | Cornu | G01G 3/13 |
| 9,488,517 | B2 * | 11/2016 | Cornu | G01G 19/024 |
| 2004/0080432 | A1 * | 4/2004 | Hill | E01F 11/00 340/942 |
| 2004/0239616 | A1 * | 12/2004 | Collins | G06F 3/0202 345/156 |
| 2005/0082094 | A1 * | 4/2005 | Gebert | G01G 19/02 177/208 |
| 2005/0271474 | A1 * | 12/2005 | Smith | B09B 1/00 405/129.5 |
| 2006/0052980 | A1 * | 3/2006 | LaFollette | G01G 19/02 702/173 |
| 2006/0086197 | A1 * | 4/2006 | Chen | G01M 5/0025 73/862.451 |
| 2006/0097730 | A1 * | 5/2006 | Park | G01R 31/088 324/534 |
| 2007/0062289 | A1 * | 3/2007 | Heyman | G01G 9/00 73/597 |
| 2007/0067141 | A1 * | 3/2007 | Besheers | G01G 19/02 702/173 |
| 2008/0136625 | A1 * | 6/2008 | Chew | G01V 5/0008 340/540 |
| 2009/0151421 | A1 * | 6/2009 | Susor | G01G 19/022 73/1.13 |
| 2009/0273352 | A1 * | 11/2009 | Yu | G01D 18/00 324/644 |
| 2011/0015808 | A1 * | 1/2011 | Dreier | F16H 59/52 701/2 |
| 2011/0037483 | A1 * | 2/2011 | Scheuermann | G01L 1/14 324/644 |
| 2011/0119028 | A1 * | 5/2011 | Bishop | G01G 23/002 702/173 |
| 2011/0127090 | A1 * | 6/2011 | Vijayaraghavan | G01G 19/03 177/133 |
| 2011/0267200 | A1 * | 11/2011 | Reynolds | G01G 19/024 340/666 |
| 2012/0265366 | A1 * | 10/2012 | Cahill | G01G 19/086 701/1 |
| 2014/0249711 | A1 * | 9/2014 | Hanson | G07C 5/08 701/29.1 |
| 2014/0291039 | A1 | 10/2014 | Hanson et al. | |
| 2016/0018252 | A1 * | 1/2016 | Hanson | G01G 19/024 73/774 |
| 2016/0019731 | A1 * | 1/2016 | Hanson | G01G 19/024 701/29.1 |

FOREIGN PATENT DOCUMENTS

| | | |
|---|---|---|
| CN | 101738244 | 6/2010 |
| CN | 202209955 | 5/2012 |
| EP | 0423440 | 4/1991 |
| EP | 0491655 | 6/1992 |
| EP | 0997713 | 5/2000 |
| EP | 2189766 | 5/2010 |
| FR | 2857092 | 1/2005 |
| GB | 2056672 | 7/1983 |
| GB | 2 250 813 | 6/1992 |
| GB | 225081 | 6/1992 |
| GB | 2250813 | 6/1992 |
| GB | 2007172458 | 7/2007 |
| GB | 2377027 | 12/2012 |
| JP | 2000314654 | 11/2000 |
| JP | 2008-232954 | 10/2008 |
| JP | 2012/42219 | 3/2012 |
| JP | 2014059807 | 4/2014 |
| WO | 2006/129999 | 12/2006 |
| WO | 2008135040 | 11/2008 |
| WO | 2013/071452 | 5/2013 |
| WO | 2014/136066 | 9/2014 |

OTHER PUBLICATIONS

U.S. Appl. No. 14/196,765, filed Mar. 4, 2014, Sensor Including Electrical Transmission-Line Parameter That Changes Responsive to Vehicular Load.

U.S. Appl. No. 14/772,707, filed Sep. 3, 2015, Sensor Including Electrical Transmission-Line Parameter That Changes Responsive to Vehicular Load.

U.S. Appl. No. 15/839,432, filed Dec. 12, 2017, Sensor Including Electrical Transmission-Line Parameter That Changes Responsive to Vehicular Load.

Boby et al. "Vehicle Weighing in Motion with Fibre Optic Sensors" Measurement & Control 26:45-47 (1993).

Kwak et al. "Load Impedance Measurement on a Coaxial Cable via Time-Frequency Domain Reflectometry" SICE-ICASE Interna-

(56) References Cited

OTHER PUBLICATIONS tional Joint Conference, Bexco, Busan, Korea, pp. 1643-1646 (Oct. 18-21, 2006).
Lin et al. "Development of an Electrical Time Domain Reflectometry (ETDR) Distributed Strain Sensor" Institute of Physics Publishing, Measurement Science Technology 16:1495-1505 (2005).
Merzbacher et al. "Fiber Optic Sensors in Concrete Structures: A Review" Smart Mater. Struct. 5:196-208 (1996).
Office Action for U.S. Appl. No. 14/196,765, dated Oct. 27, 2015, p. 7 which has footnote 1 which details "What is Coaxial Cable?" definition from WhatIS.com website (http://searchdalacenler.lechtargel.com/definition/coaxial-cable).
Paulter "An Assessment on the Accuracy of Time-Domain Reflectometry for Measuring the Characteristic Impedance of Transmission Lines" IEEE Transactions on Instrumentation and Measurement, 50:1381-1388 (2001).
Tong et al. "Study on Elastic Helical TDR Sensing Cable for Distributed Deformation Detection" Sensors 12:9586-9602 (2012).
Shin et al. "Evaluation of the Load Impedance in Coaxial Cable via Time-Frequency Domain Reflectometry" Advanced Signal Processing Algorithms, Architectures, and Implementations XIII, Proceedings of SPIE, vol. 5205 (2003).
Shin et al. "Time-Frequency Domain Reflectometry for Smart Wiring Systems" Advanced Signal Processing Algorithms, Architectures, and Implementations XIII, Proceedings of SPIE, vol. 4791 (2002).
CIPO Examination Notes for Int'l Application No. PCT/IB2014/059406 (Jun. 2014).
Written Opinion of the ISA for PCT/2014/059434, dated Jun. 25, 2014.
Written Opinion of the ISA for PCT/IB2014/059406 dated Jul. 2, 2014.
International Search Report for PCT/2014/059434, dated Jun. 25, 2014.
International Search Report for PCT/2014/059434, two pages, dated Jul. 4, 2014.
International Search Report for PCT/IB2014/059406, dated Jun. 2014.
International Preliminary Report on Patentability for PCT/2014/059434, dated Jun. 25, 2015.
International Preliminary Report on Patentability for PCT/2014/059434, 21 pages, dated Jun. 25, 2015.

\* cited by examiner

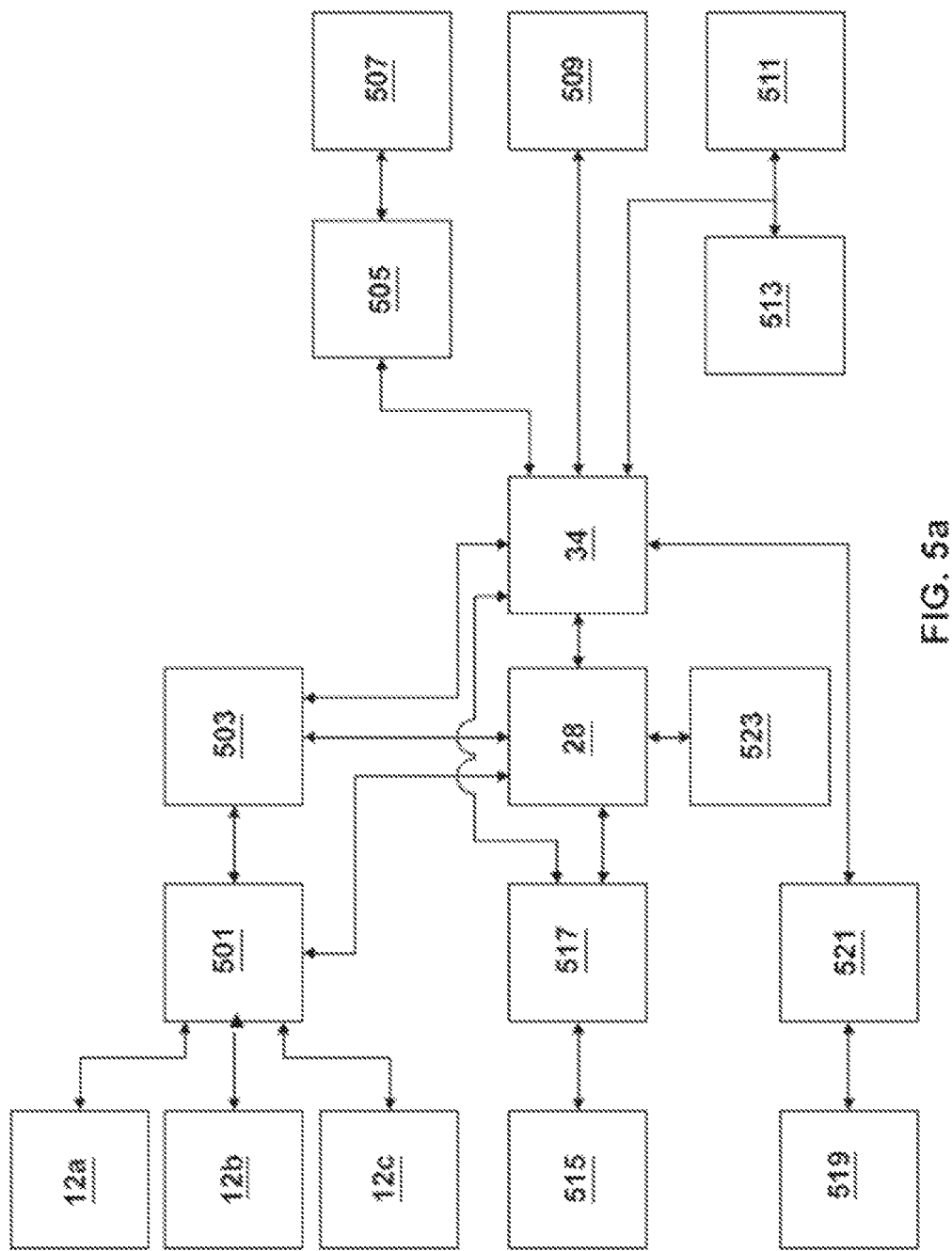

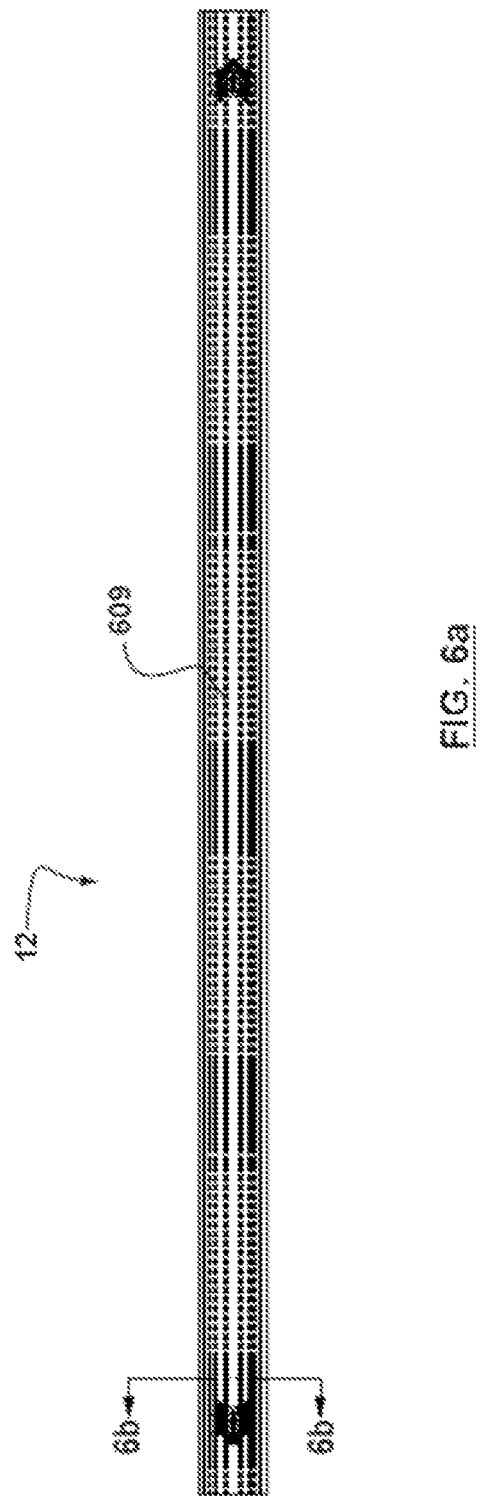

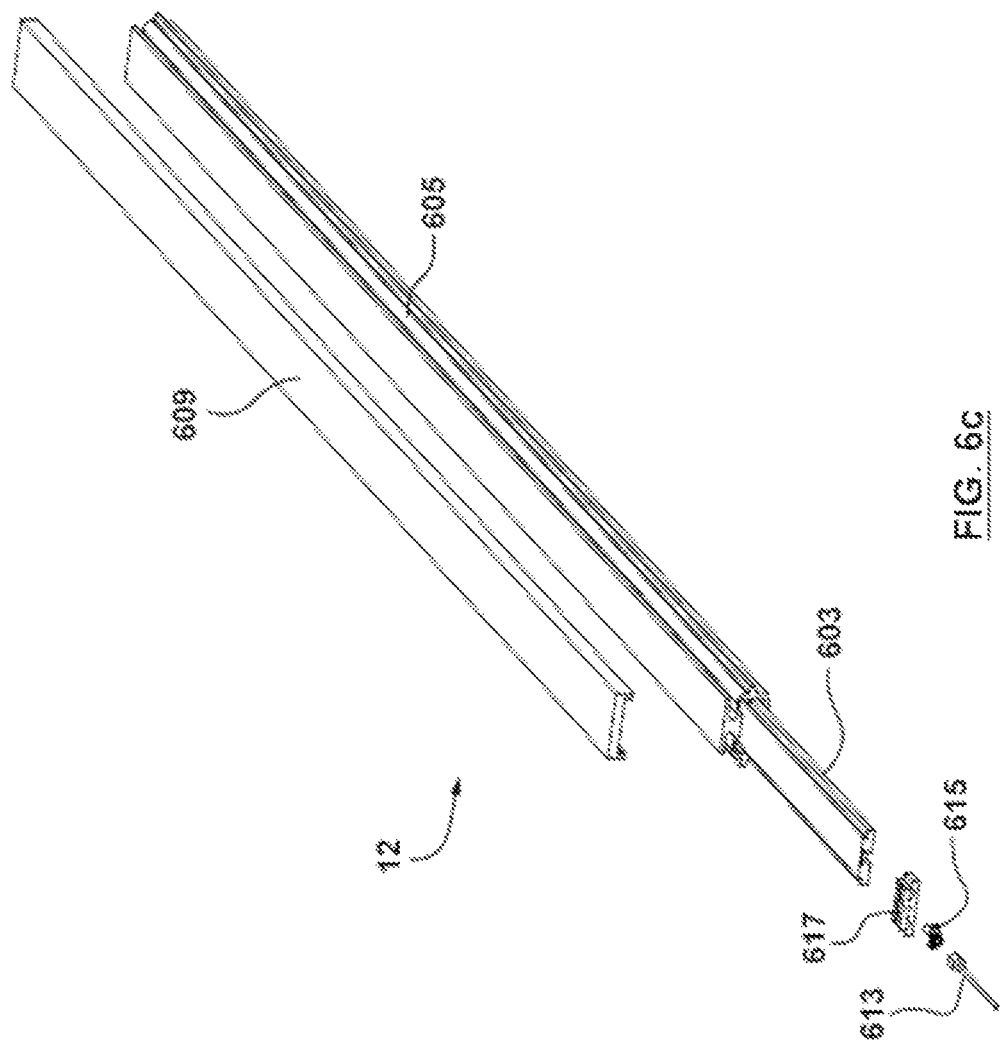

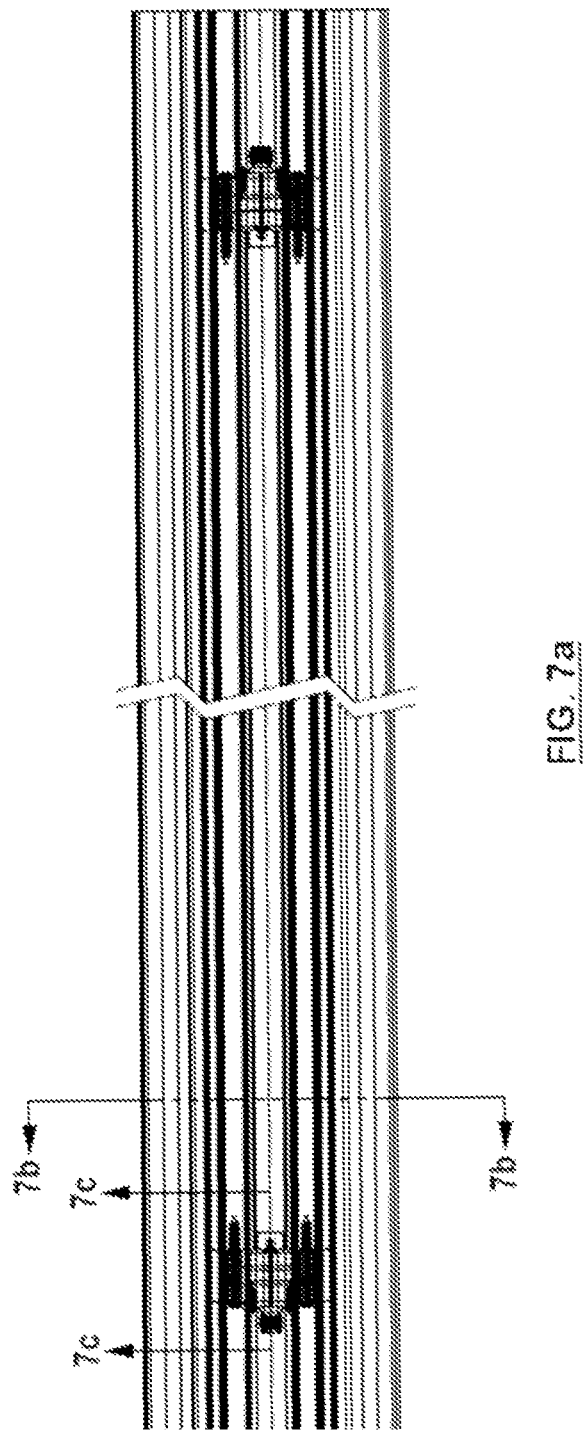

SYSTEM AND METHOD FOR MEASURING MOVING VEHICLE INFORMATION USING ELECTRICAL TIME DOMAIN REFLECTOMETRY

CROSS-REFERENCE TO RELATED APPLICATION(S)

This application is the U.S. national phase of International Application No. PCT/IB2014/059406 filed Mar. 3, 2014 which designated the U.S. and claims the benefit of U.S. Provisional Patent Application Ser. No. 61/772,138 filed on Mar. 4, 2013 and U.S. Utility patent application Ser. No. 13/835,797 filed on Mar. 15, 2013, the entire contents of each of which are hereby incorporated by reference.

TECHNICAL FIELD

The embodiments disclosed herein relate generally to intelligent transportation systems.

BACKGROUND

Intelligent transportation systems may involve data collection, toll collection, vehicle classification, weigh in motion (WIM), and other traffic monitoring or traffic management systems.

For example, WIM systems are used to detect and weigh vehicles in motion in order to enhance the operation of road systems in a safer and more efficient manner.

A WIM system uses one or more sensors to obtain information about a vehicle as it is sensed by the sensor, typically as the vehicle moves over the sensor. Some information may be measured directly from a sensor, and other information may be measured and derived from a combination of sensors operating together.

Vehicle information that may be measured includes, for example, the number of axles, weight per axle, weight per wheel, vehicle weight, wheel count, wheel spacing, axle spacing, inter-axle spacing, axle width, and axle and/or vehicle speed. Aggregate information may also be collected such as the total number of vehicles detected by the sensors.

Time Domain Reflectometry

Generally, time domain reflectometry (TDR) is a measurement technique based on the principle that a transmission line of a particular geometry presents a known characteristic impedance. Therefore, changes to the geometry of the transmission line result in changes in the characteristic impedance that can be measured using TDR techniques. A skilled person would understand that time domain reflectometry may be used with optical or electrical signals, and that practically the optical and electrical signals are physically different requiring differently skilled knowledge and equipment to measure changes in transmission line characteristics.

In an electrical transmission line, a reflection will be generated whenever an incident wave meets a change in the characteristic impedance, which is also known as a discontinuity. TDR measurement techniques can then be used to determine the location and magnitude of the discontinuity in the transmission line from the reflected wave. Thus, the time the reflected wave takes to travel back along the transmission line can be translated into a distance along the transmission line. The magnitude of the voltage of the reflected wave can be used to calculate the amount of change in the characteristic impedance.

TDR measurement techniques may use a step input voltage for the incident wave shape as it eases the complexity of interpreting the reflected signals. In source- or both-ends terminated transmission lines, the step input voltage is divided between the source impedance and the transmission line impedance. If the source and transmission line impedances are matched, then the voltage measured between the source and the transmission line over the round-trip of the incident wave along the transmission line is half of the step input voltage. Where discontinuities exist on the transmission line, the voltage measured will deviate from exactly half due to the received reflections. Other approaches for TDR measurement may also be used, such as wave modulation with a swept frequency.

UK patent application GB 2,250,813A discloses a weighing apparatus for vehicles. The apparatus comprises a fibre optic cable whose light transmission characteristics vary under load and is encased in a pressure pad of resilient material and laid across a roadway. As a vehicle crosses the pressure pad, a time domain reflectometer calculates the load exerted by each wheel by monitoring the intensity of back scattered light from the fibre optic cable.

Known traffic monitoring and transportation management systems typically use strain gauge type sensors, for example, a mechanical strain gauge or piezo electric strain sensor, that are not configured as a transmission line. Therefore, existing intelligent transportation systems using strain gauge type sensors have signal processing systems and digital processing systems that do not utilize electrical TDR (ETDR) measurement techniques.

SUMMARY

Existing intelligent transportation systems may be improved by increasing the fidelity of the measured or extracted information corresponding to the physical property of the vehicle being measured by the sensor, e.g. information about the vehicle's wheel weights, as the vehicle's wheels move over the sensor. Existing intelligent transportation systems may also be improved by adding the ability to measure additional wheel specific parameters.

Being able to accurately measure the magnitude of the wheel load on the sensor is a separate technical problem from being able to accurately determine the number of wheels, and/or where the wheel load or loads are applied on the sensor.

An object of the present invention is to provide a system for measuring moving vehicle information. In accordance with one aspect of the invention, there is provided a system for measuring moving vehicle information comprising: a sensor configured to respond to one or more wheels of the vehicle, where one or more of said wheels changes the characteristic impedance of the sensor at the wheel's contact location; an electrical time domain reflectometry signal processing system capable of measuring the change in the impedance of the sensor and converting the impedance change to a signal; and a data-processing system capable of extracting vehicle information from the signal.

The system is configured to measure moving vehicle information, comprising number of wheels per axle, wheel pressure and wheel-road contact dimensions which include wheel width, wheel location on the sensor and the length of time the wheel exerts force on the sensor as measured using electrical time domain reflectometry (ETDR). Also, axle width and inter-axle spacing may be calculated. Where axle width is understood as the width of an axle of a vehicle calculated as the distance between the measured wheels of the vehicle along one axle. Inter-axle spacing is understood as the distance between one set of wheels on one axle and another set of wheels on another axle of the measured vehicle. Also, location or position of the vehicle in the lane may be derived from the location of the wheels of the vehicle as they pass over the sensor, since the sensor generally runs across the entire lane.

In another aspect of the invention, there is provided an apparatus for measuring information about a moving vehicle comprising a sensor whose impedance changes in response to an applied load; a signal source for transmitting an electrical signal along the sensor; a receiver for measuring a reflected electrical signal reflected by the sensor, the reflected electrical signal caused by the impedance change of the sensor; and a data processing system for extracting information about the vehicle from the reflected electrical signal.

In various embodiments of the system and apparatus, the sensor comprises a transmission line that is integrated transversely into a roadway so that traffic, i.e. vehicles, pass over the sensor. The force exerted on the sensor, due to the weight of the passing wheel of the vehicle, causes a deflection in the structure of the transmission line, thereby affecting the impedance of the transmission line where the force is applied. The impedance change is measured using ETDR techniques, and the vehicle information is extracted from the measured impedance changes using signal processing systems and digital processing systems.

In one embodiment, the sensor comprising a transmission line may be calibrated at every position along the line in order to improve accuracy.

In another embodiment, the sensor is protected by encasing it in a resilient and durable housing.

In a further embodiment, the sensor may be positioned above the road. In an alternative embodiment, the sensor may be positioned flush with the road surface. In another alternative embodiment, the sensor may be positioned below the road surface.

The sensor in one embodiment is generally transversely oriented relative to the movement of the vehicles, spanning the width of the road. In an alternative embodiment, the sensor spans one lane of the road. A skilled person would understand, however, that different sensor orientations, placements, and lengths are possible.

In another aspect of the invention, there is provided a method for measuring moving vehicle information using time domain reflectometry. In one embodiment of the invention, the method comprises measuring the change in the impedance of a sensor using electrical time domain reflectometry signal processing; converting the impedance change to a signal; and processing the signal to extract vehicle information.

In various aspects and embodiments of the invention, the use of ETDR to measure moving vehicle information provides additional data compared to known intelligent transportation systems, and more reliable information over prior known vehicle information systems. In another embodiment, the use of ETDR to measure moving vehicle information may be more cost effective over known systems.

In one embodiment of the invention, the use of ETDR to measure moving vehicle information allows for the collection of detailed vehicle information, including spatial data, using a single ETDR sensor. This includes spatial data that is not reasonably obtainable in a cost effective manner using known systems.

In another embodiment, the weight of the vehicle can be calculated by integrating the wheel pressure associated with the instantaneous wheel-sensor contact duration measured using the ETDR techniques over the wheel-road contact length. The wheel-road contact length is determined by the speed of the vehicle, specifically the speed of the wheels of the vehicle as they move over the ETDR sensor and wheel-sensor contact duration. The weight of the vehicle is then calculated as the sum of the weight calculated for each wheel of the vehicle. The weight of each axle is calculated as the sum of the weight for each wheel associated with that axle.

A skilled person would understand that, generally, a vehicle travelling on a road has wheels, that the wheels are travelling at the same speed as the vehicle, and that the wheels are practically synonymous with the tires. A skilled person would also understand that vehicle speed may be determined in a variety of ways (such as, by way of a speed measuring system). In one embodiment of the invention, vehicle speed may be calculated by separating two instances of the sensor by a known distance (between the sensors), then calculating the vehicle speed by measuring the time it takes the vehicle to travel the fixed distance between the two instances of the sensor. The sensors could be two ETDR sensors, or other known sensors such as loop sensors, mechanical strain gauges, or piezoelectric sensors, or a combination of different sensor types. Vehicle speed may also be measured by radar or other known techniques (generically known as a speed measuring system). For the system to calculate the weight of the vehicle, the system needs to receive a speed measurement of the moving vehicle.

In one embodiment, the measurement of moving vehicle information comprises one or more ETDR sensors that may be used in combination with other non-ETDR sensors such as temperature sensors, speed sensors, loop or vehicle presence sensors, accelerometer sensors, seismic sensors, acoustic sensors, or any other sensor suitable for collecting relevant road condition, road environment, or vehicle information.

In various aspects and embodiments of the invention, the vehicle information and/or data collected by the apparatus, system or method may be stored in a data store. In one embodiment, information of various forms (e.g. data) may be made available over a network such as a virtual private network (VPN) or the internet. In another embodiment of the invention, the data store may be a hard drive or solid state drive, or other known storage technology. In yet another embodiment, the data store may have a physical interface whereby a user may collect the information and/or data, e.g. serial port, parallel port, ethernet port, usb port, or other known computer interface.

A skilled person would understand that the information may be in a raw or processed form, or that information in the form of data may be metadata, or other data generated by the system, apparatus or method that is related to the operation of the system, apparatus or method for measuring moving vehicle information, and not limited to vehicle information alone, including the interaction of the roadway with the vehicle.

BRIEF DESCRIPTION OF DRAWINGS

The non-limiting embodiments may be more fully appreciated by reference to the following detailed description of the non-limiting embodiments when taken in conjunction with the accompanying drawings, in which:

FIG. 5a is a system block diagram of an example embodiment system for measuring vehicle information using a plurality of ETDR sensors, a vehicle presence sensor, and a temperature sensor;

FIGS. 6a-6c are respectively perspective view, top view, and, sectional view along the line A-A of an example embodiment of an ETDR sensor;

FIGS. 7a-7f are respectively top view, and end view, sectional views along the line A-A and B-B, and, detail views A and B of an example embodiment of an ETDR sensor.

Figure 1A:
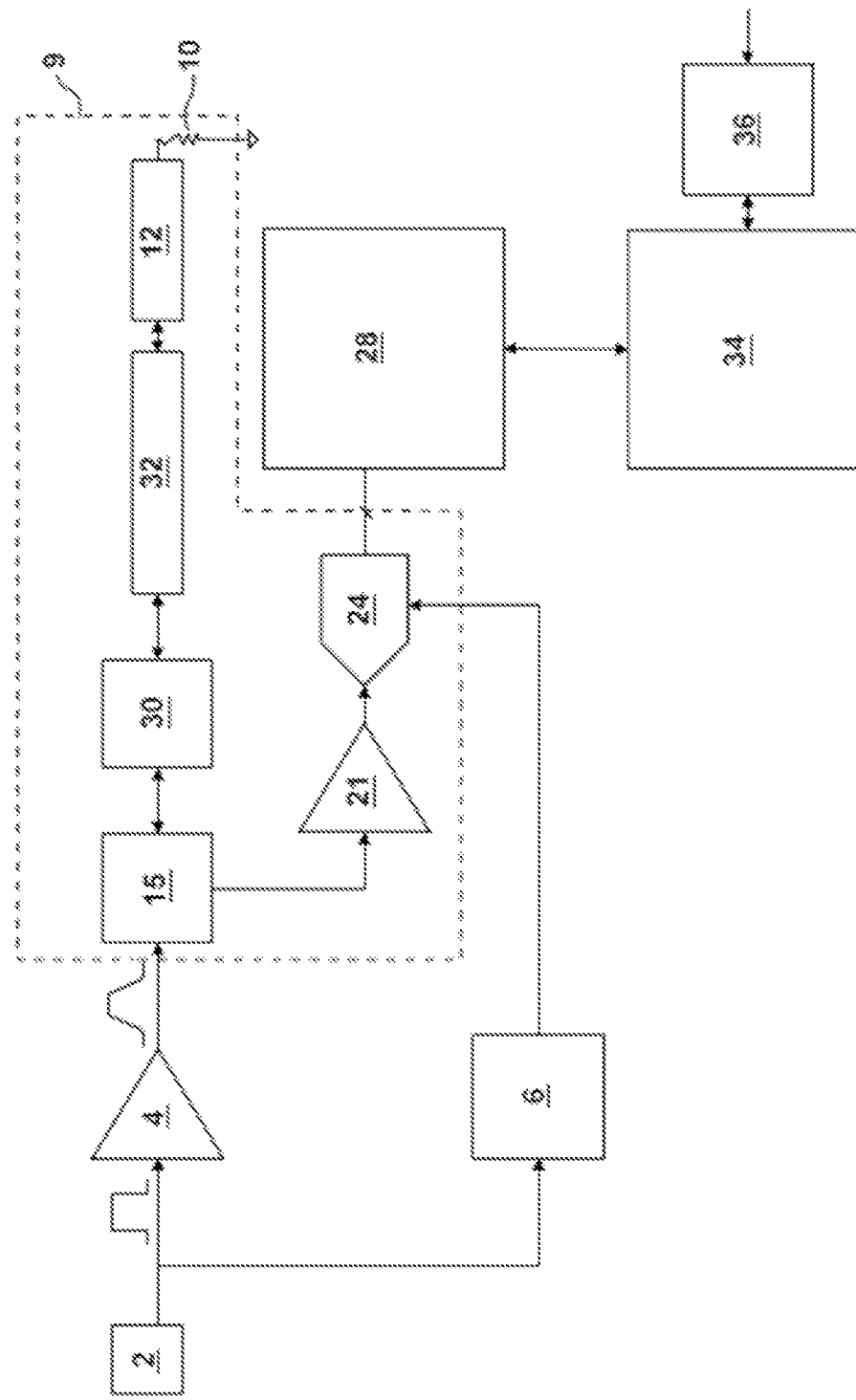
FIG. 1a is a system block diagram of an example embodiment system for measuring vehicle information.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

Corresponding reference characters indicate corresponding components throughout the several figures of the Drawings. Elements in the several figures are illustrated for simplicity and clarity and have not necessarily been drawn to scale. For example, the dimensions of some of the elements in the figures may be emphasized relative to other elements for facilitating an understanding of the various presently disclosed embodiments. In addition, common, but well-understood, elements that are useful or necessary in commercially feasible embodiments are often not depicted in order to facilitate a less obstructed view of the various embodiments of the present disclosure.

LISTING OF REFERENCE NUMERALS USED IN THE DRAWINGS 2 base crystal oscillator, or base xo, or crystal oscillator
4 driver, or high-bandwidth driver
6 phase-locked loop, or PLL
8 voltage controlled crystal oscillator, or VCXO
9 bandwidth sensitive area
10 terminator, end terminator, or termination
11 instantaneous load, or load
12 parametric disturbance sensor, PDS, PDS sensor, or sensor
12a first PDS port, parametric disturbance sensor port, or sensor ports
12b second PDS port, parametric disturbance sensor port, or sensor ports
12c third PDS port, parametric disturbance sensor port, or sensor ports
14 source terminator
15 bridge, or hybrid circuit
16 source terminator reference
18 end terminator reference
20 differential amplifier
21 receiver, or receiver amplifier
22 amplifier
24 analog-to-digital converter, ADC, high-speed ADC, or higher resolution ADC
28 counting logic, field-programmable gate array, FPGA, high-speed logic, or logic
30 transient voltage suppression protection circuitry
30a TVS protection circuitry
30b TVS protection circuitry
30c TVS protection circuitry
32 coaxial lead cable, or lead cable
34 computer
36, Ethernet port
201 low-pass filter, LPF, passive analog integrating low-pass filter, or passive analog integrating LPF
203 gate/hold circuit
205 digital-to-analog converter, or DAC
301 comparator, CMP, or high-speed comparator
303 tracking low-pass filter, or tracking LPF
304 bias
305 SUM, or adder
501 wheel analog front end, or wheel AFE
503 wheel data converter
505 transceiver, or XCVR
507 serial port
509 SD card port
511 Ethernet port
513 power over Ethernet device, or POE device
515 loop port
517 loop analog front-end, loop AFE
519 temperature port
521 1-wire sensor bridge
523 real-time clock
551 radio-frequency (RF) switch, or the switch
553 reference terminator
590 output
592 output
594 input
601 sensor core
603 sensor carrier
605 sensor carrier exterior housing, or sensor carrier extrusion housing
607 support tubing
609 cap extrusion
610 adhesive
611 isolation foam
615 connector
617 termination block
701 concrete
705 grout
707 screws
709 closed cell foam, or foam
711 electromagnetic interference (EMI) gasket
712 x-axis
714 y-axis
716 z-axis

DETAILED DESCRIPTION OF THE NON-LIMITING EMBODIMENT(S)

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of the description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise. It is understood that "at least one" is equivalent to "a". The aspects (examples, alterations, modifications, options, variations, embodiments and any equivalent thereof) are described with reference to the drawings. It should be understood that the invention is limited to the subject matter provided by the claims, and that the invention is not limited to the particular aspects depicted and described.

The various aspects and embodiments of the invention will now be described with reference to the figures.

Exemplary System and Operation

Referring now to FIG. 1a, there is shown an embodiment of the system and apparatus for measuring moving vehicle information. This embodiment may measure information about the moving vehicle such as the number of wheels per axle, wheel pressure and wheel-road contact dimensions including wheel width, wheel location on the sensor and the length of time the wheel exerts force on the sensor. From the vehicle information obtained, axle width, inter-axle spacing and, lane position may be determined. Vehicle speed, vehicle length, and vehicle count may be measured using this embodiment in conjunction with additional sensors.

Figure 1B:
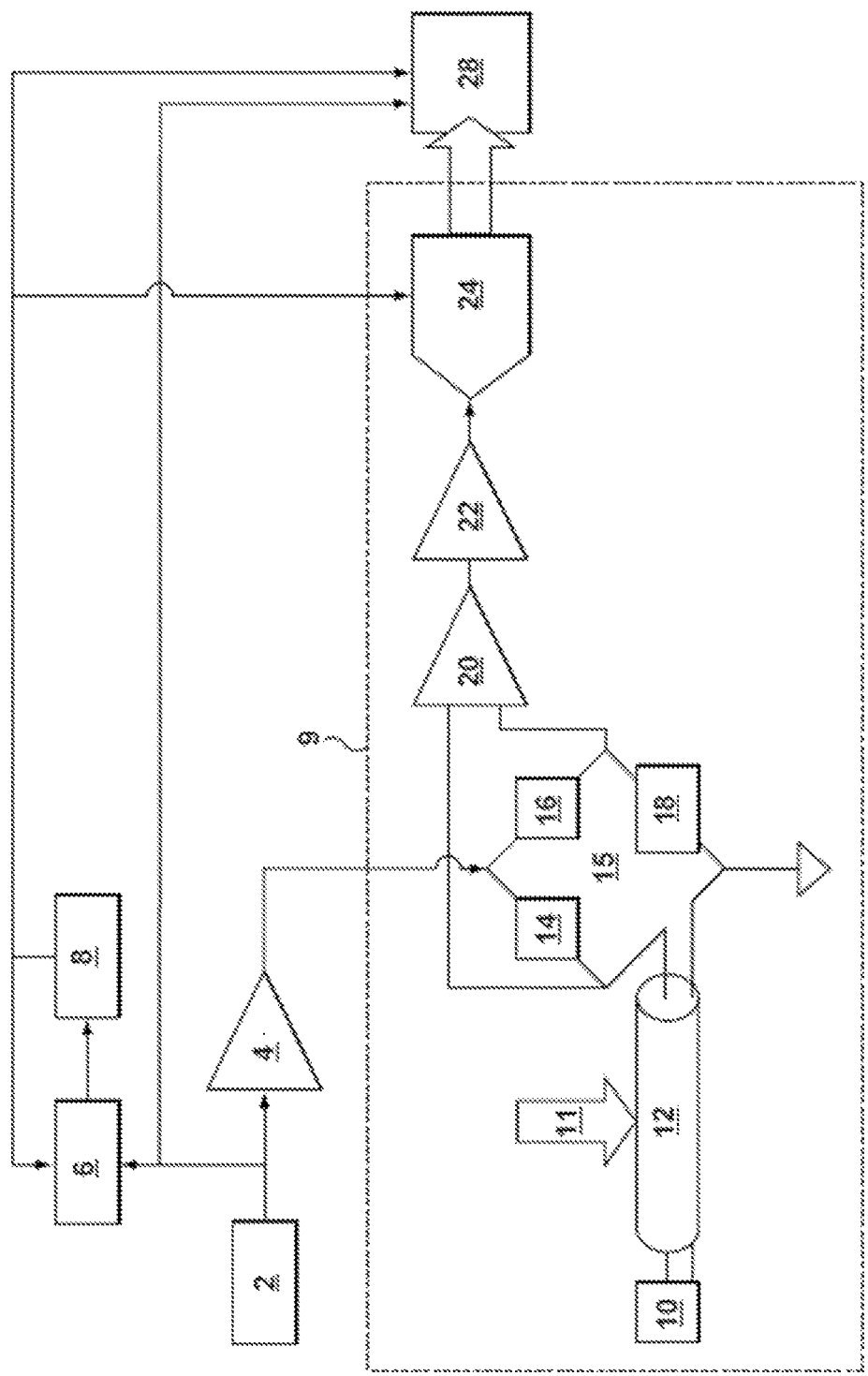
FIG. 1b is a system block diagram of an example embodiment system for measuring vehicle information.

In the operation of this embodiment of the system and apparatus as shown in FIG. 1a, the crystal oscillator 2 generates a sweep clock signal, such as 10 MHz (Megahertz) reference clock signal, which is buffered by a high-bandwidth driver 4. The crystal oscillator 2 is also called a base XO 2. The signal is driven through a hybrid circuit 15 to the transmission line, which may consist of a coaxial lead cable 32, a printed circuit board (PCB) trace (not shown), and a parametric disturbance sensor 12. The parametric disturbance sensor 12 is also called the PDS 12 or the sensor 12. The components of the system in the bandwidth sensitive area 9 must be able to pass high frequencies in order to reproduce the spatial features of the load 11 (the load 11 is depicted in FIG. 1b).

Parametric Disturbance Sensor (PDS)

A skilled person would understand that the parametric disturbance sensor 12 (PDS stands for parametric disturbance sensor) is the portion of the transmission line that is, in an embodiment, located transversely, embedded within, and flush with the surface of the roadway. The skilled person would also appreciate that the signal would travel along the entire transmission line, and that the entire transmission line may be considered as the entire sensor in other embodiments. A description of an exemplary PDS construction for use with the system and apparatus of the invention is provided under the section entitled, "Sensor" of the detailed description.

The PDS 12 is constructed so as to be capable of changing impedance in a predictable manner. In an embodiment of the invention, the PDS 12 is configured to produce detectable changes in impedance for vehicles with tire pressures ranging from 10 pounds per square inch (PSI) to 150 PSI. In another embodiment, the PDS 12 is configured to allow for a detectable transverse spatial resolution of 1.5 inches, which is obtained in cooperation with the capabilities of the electronics interface. The PDS 12 is attached to an appropriate terminator 10 for minimizing reflections, which is a termination resistor that closely matches the characteristic impedance of the PDS 12, e.g. a 1% 50 ohm resistor.

Electrical Time Domain Reflectrometry Signal Processing System

Any impedance mismatches along the transmission line such as those produced by a wheel load results in reflections that travel back towards the source of the signal in the transmission line. The hybrid circuit 15 directs these reflections to a receiver 21, where they are amplified, and then digitized by an analog-to-digital converter 24. The analog-to-digital converter 24 may be called the ADC 24. The receiver 21 may be called a receiver amplifier. The converted and sampled data is processed by a field-programmable gate array 28. The field programmable gate array 28 may be called the FPGA 28. Then, the data as processed by the FPGA 28 is further processed by the computer 34 to obtain the desired information about the vehicle. The computer 34 is connected to an Ethernet port 36.

The sweep clock period is chosen so that the half period is larger than the round-trip time of the wave traversing the PDS 12. The following equation calculates the maximum sweep clock frequency at which the device and system can operate:

$$\text{Frequency\_max} = 1/\text{Time\_min};$$

In one embodiment of the system and apparatus of the invention, the total transmission line delay may comprise the PDS 12 delay, the lead cable 32 delay, and the PCB trace delay. Therefore $T\_min = 4 \times (D\_PDS + D\_lead + D\_trace)$. In another embodiment, T_min may be as small as just 4×(D_PDS), independent of lead cable and trace length. Then, multiple edges would exist within the entire transmission line at any instance in time, however, no more than one edge would be within the PDS 12 itself. The signal witnessed at the receiver 21 would consist of the superposition of multiple reflections, but reflections from the lead cable and PCB trace are constant and may be baseline subtracted leaving only the reflection from the PDS 12. Therefore, Time_min=4 (Delay_PDS).

In yet another embodiment of the invention, the crystal oscillator 2 generates a 10 megahertz (MHz) reference clock signal. The driver 4 is used to buffer the clock signal, and to produce a high edge-rate signal, e.g. a low-voltage positive emitter-coupled logic (LVPECL) with 300 picosecond rise/fall times. This high-edge rate signal is driven into the hybrid circuit 15 and the transmission line.

The hybrid circuit 15 is used to couple the transmitted and received signals to and from the transmission line. The sweep clock signal travels from the driver 4 to the termination 10 at the end of the sensor 12, and the reflected signals travel from the source of the impedance mismatch in the transmission line, preferably in the sensor 12, to the receiver 21. The hybrid circuit 15 allows the receiver 21 to see the reflected signals without seeing the transmitted signal. The basic function of the hybrid circuit 15 is that it subtracts the transmit signal from the composite signal containing both the transmitted and received signals, yielding only the received signal. Additionally, the received signal is amplified, in an embodiment, by a gain of 10.

In an embodiment of the invention, a transient voltage suppression protection circuitry 30 may be used to protect the apparatus or system hardware from electrostatic discharge (ESD) or lightning-induced surges. When the protection circuitry has sufficiently low capacitance it does not appreciably affect the bandwidth of the apparatus or system. Transient voltage suppression may be referred to as TVS.

The lead cable 32 is for connecting the hybrid circuit to the PDS 12. In an embodiment, the lead cable 32 is under three (3) feet long with a characteristic impedance of 50 ohms, but a skilled person would understand that choosing a different lead cable length or characteristic impedance is possible.

The function of the receiver amplifier 21 is to amplify the received signal from the hybrid circuit 15 and to drive the amplified differential signal into the analog-to-digital converter 24 (ADC). Preferably, the bandwidth of the output of the receiver 21 is 900 MHz. In an embodiment, a fully differential amplifier with an amplification factor of 4 may be used. A skilled person would understand that different amplifier designs may be used.

The ADC 24 is for digitizing the signal from the receiver amplifier 21. Also, the ADC 24 receives a sampling clock signal from a phase-locked loop 6. The phase-locked loop 6 is also called the PLL 6. The digital output, representing the sampled version of the signal from the receiver 21, of the ADC 24, is connected to a field-programmable gate array 28. The field-programmable gate array 28 is also called the FPGA 28. In an embodiment, the ADC 24 has 12 bits of resolution with 104.88 mega samples per second (MSPS). It will be appreciated that skilled persons would understand that different ADC resolutions with different sampling rates may be used (if so desired). The phase-locked loop 6 is for generating a sampling clock that allows the use of an equivalent time sampling technique. Equivalent time sampling is a known technique that allows for an effective sampling rate much higher than the actual sampling rate.

In an embodiment, the PLL 6 is used to lock the 104.88 MHz sampling clock to the 10 MHz sweep clock. This ratio is 1311/125, and is chosen so that the ADC samples the reflected signal at 1311 evenly spaced positions after 125 cycles of the sweep clock. Therefore, in this embodiment, with these parameters, a skilled person would understand that a practical sensor length of 13 feet with the lead cable length being 3 feet of RG-58 (a type of coaxial cable) is appropriate. A skilled person would also understand that different sensors lengths or lead cable lengths may be used under different sampling conditions.

Data Processing System

The FPGA 28 is for receiving and processing the ETDR data from the ADC 24, and sending it to the computer 34 (via a supervisory interface). The computer 34 cooperates with the FPGA 28 to process the digitized and FPGA processed signal data. In an embodiment, the computer 34 aggregates individual wheel load events received from the FPGA 28 into vehicle records containing numerous pieces of vehicle profile information. In an embodiment, the computer 34 is a computer on a module. A skilled person would understand that there are other equivalent computing or embedded computing solutions that may be used instead. In an embodiment, these processing steps may include, ADC sample receiving, sample reordering, sweep averaging, sweep zone integration, and positional monitoring.

In an embodiment, a zone refers to a range of samples associated with positions located transversely along the length of the PDS 12 that is experiencing a load, or disturbance, from a wheel or wheels. For example, a car crossing the PDS 12 would create two (2) zones per axle, i.e. one zone for the left tire and one zone for the right tire for each axle. Each zone is a number of sample positions wide centered on the wheel. Those sample positions values are then integrated over the wheel-sensor contact duration producing a raw tire weight. Then, once the speed of the vehicle is known, the absolute weight or average pressure can be calculated from the raw weight and the speed of the vehicle.

In an embodiment, digital samples are clocked into the FPGA 28 at 104.88 mega samples per second (MSPS), corresponding to the ADC 24 sample rate. Due to the equivalent time sampling technique used to collect the 1311 evenly spaced reflections, the samples will arrive at the FPGA 28 out of sequence. To reorder the samples, they are placed into the internal memory locations of the FPGA 28 using an address pointer that increments by 125 modulo 1311. A full set of 1311 consecutive samples constitutes a sweep. An external presence detection device or vehicle presence sensor, e.g. an inductive loop sensor, light curtain, microwave sensor or acoustic sensors, is used to ensure wheels are absent from the PDS 12. When wheels are absent, one or more sweeps may be averaged to assemble a baseline sweep or control sweep. The baseline sweep is regenerated frequently to ensure it accurately represents the current properties of the undisturbed or unloaded instance of the PDS 12. Incoming sweeps are then compared against the baseline sweep and any significant difference detected forms the basis of a disturbance. A disturbance zone is limited in width to either a single or multi-wheel array on a given side of a vehicle's axle. A zone thus contains only a subset of consecutive samples within a sweep, but may resize dynamically to accommodate variations in the disturbance width. Each zone is integrated over the width and duration of the disturbance. Once the disturbance exits the PDS 12, parameters such as start time, location, width, duration, and raw weight are stored to memory and an interrupt flag is set to signal the computer 34 that a new wheel event has occurred. Once the interrupt is detected by the computer 34, it may retrieve the wheel event data from the memory of the FPGA 28 at a rate determined by the clock of the computer 34.

System Configurations for Measuring Vehicle Parameters

Measuring Wheel Pressure and Wheel-Road (Sensor) Dimensions

Referring now to FIG. 1*b*, there is shown another embodiment of the system and device for measuring moving vehicle information. This embodiment may measure information about the moving vehicle such as number of wheels per axle, wheel pressure and wheel-road contact dimensions including wheel width, wheel location on the sensor and the length of time the wheel exerts force on the sensor. From the vehicle information obtained, axle width, inter-axle spacing and, lane position may also be determined.

In this embodiment, the base crystal oscillator 2 cooperates with a driver 4 to generate a step input incident signal at the rate of the base crystal oscillator 2. The incident signal is driven into a sensor 12 through the hybrid circuit 15; the hybrid circuit 15 may be called a bridge 15. A load 11 may be applied to the sensor 12, and the load 11 will generate a reflected signal along the sensor 12 that is sensed on the bridge 15. The differential reflected signal is transformed to a single-ended reflected signal by a differential amplifier 20 and is then amplified by an amplifier 22. A skilled person would understand that a transformer may also be used instead of a differential amplifier 20. An ADC 24 converts the analog reflected signal into digital reflected signal sample data that is fed into the FPGA 28. The FPGA 28 may also be called a logic 28. The logic 28 reassembles the reflected signal from the digital reflected signal sample data, and performs calculations to calculate the magnitude of the load 11 or the location of the load 11 on the sensor 12 or both. Additionally, other vehicle information may be obtained by the logic 28.

As the load 11 contacts and traverses the sensor 12, the sensor 12 continuously reacts to the instantaneous load 11. The load 11 creates a change in the geometry of the sensor 12 and a corresponding measurable change in the characteristic impedance, which generates the reflected signal when the incident signal meets the discontinuity.

The sensor 12 is a transmission line that is terminated at both ends. A source terminator 14 (Zsrc) provides a voltage measurement point between the source terminator 14 and the sensor 12. An end terminator 10 (Zend) improves the signal-to-noise ratio by reducing extraneous end reflections of the incident signal that can pollute the reflected signal. Additionally, the resistance and capacitance of the sensor 12 interact to produce a length dependent low pass filter that increases the rise and fall times of the reflected signal.

The relationship between the load 11 and the reflection coefficient of the sensor is preferably linear. This means that the changes in the reflection coefficient or voltage deviations from nominal are a linear representation of the load 11 at the location where the load 11 is applied to the sensor 12.

A skilled person will understand that the design and selection of the sensor 12 is varied, and will depend on the vehicle information to be measured by the system, device, or method. This includes making specific design decisions and trade-offs regarding cost, complexity, performance, and durability.

In an embodiment, the sensor 12 is embedded in the surface of a roadway transverse to a moving vehicle's direction of travel. A flat top portion of the sensor 12 could be raised slightly above the surface of the roadway to assure compression when the load 11 is present. Compression of the sensor 12 due to the load 11 will create changes in its geometry causing changes in the impedance that will generate the reflected signal in response to the step input incident wave.

For weigh-in-motion and vehicle detection, an embodiment of the PDS 12 is described below. In another embodiment, the sensor 12 may be a compressible coaxial cable encapsulated in a jacket with a rectangular cross section. In another embodiment, for vehicle detection, the sensor 12 may be two parallel conductors that form a twin-lead transmission line, where the proximity of the vehicle causes changes in the dielectric constant that may be measured as a change in the characteristic impedance using ETDR techniques.

The components of the system in the bandwidth sensitive area 9 must be able to pass high frequencies in order to reproduce the spatial features of the load 11. By defining the required resolution between spatial features, the step input incident signal rise time and bandwidth may be calculated:

$$\text{time\_rise} = \text{Length(transmission line feature spacing)}/2*\text{Velocity\_propagation(propagation velocity of the medium)}$$

$$\text{BandWidth} = 0.35\text{(single-pole constant of proportionality)}/\text{time\_rise(10\%-90\% rise time)}$$

The base crystal oscillator 2 generates the incident signal that is rising and falling with a fixed half-period that is longer than the round-trip time for the length of the sensor 12. The rise and fall times of the incident signal are calculated as above and are sufficiently fast to reveal the spatial resolution of the load 11 along the sensor 12. The longer the rise and fall times, the lower the incident signal's bandwidth, resulting in less resolution available from the reflected signal. Additionally, the base crystal oscillator 2 must have sufficiently low jitter and the signal chain bandwidth must be sufficiently high in order to maintain the spatial resolution of the spatial features of the load 11.

The driver 4 continuously drives the rising and falling incident signal from the base crystal oscillator 2 into the sensor 12 through the bridge 15. The 10%-90% rise and fall times of the driver 4 may be characterized based on the spatial feature resolution size. In an embodiment, to drive the incident signal with a feature spacing of six (6) inches, the driver 4 should have corresponding 10%-90% rise and fall times of approximately 313 picoseconds:

$$10\%\text{-}90\% \text{ rise/fall time} = 0.1524 \text{ m (or 6 in)}/[2*c \text{ (speed of light)}*0.81\text{(propagation velocity constant)}]$$

$$10\%\text{-}90\% \text{ rise/fall time} = 313 \text{ picoseconds}$$

Next, the bridge 15 is used to difference the reflected signal from the sensor 12, from that of a pair of fixed reference terminators consisting of a source terminator reference 16 (Zsrc') and an end terminator reference 18 (Zend'). The fixed reference terminators have nominally the same impedances as the sensor 12, the source terminator 14, and the end terminator 10. The bridge 15 highlights the deviations in the reflected signal from nominal values, resulting in a lower voltage dynamic range requirement of the ETDR signal processing means in the bandwidth sensitive area 9.

In an embodiment of the invention, the bridge 15 presents a common-mode voltage to the input of the differential amplifier 20. In another embodiment, the bridge 15 presents a common-mode voltage to the input of the transformer (not shown) of half of the output voltage of the driver 4 during the positive half-cycle of the incident signal, and zero elsewhere. The differential amplifier or transformer converts its input from a differential signal to a single-ended signal by removing the common-mode signal and this further reduces the required voltage dynamic range of the ETDR signal processing means in the bandwidth sensitive area 9. A skilled person would understand that other methods of eliminating the input signal from a reflected signal could be used without departing from the scope of the present disclosure. The skilled person would understand that the signal observed at the inputs of the differential amplifier 20 consists of a) common-mode signal from the driver 4, and b) differential-mode reflections from the sensor 12. The skilled person would also understand that it is ideal that the contribution of the driver 4 to the signal is common-mode, however, practically there may be slight imbalances in the bridge Zsrc and Zend values that will introduce an additional differential-mode portion to the signal at the inputs of the differential amplifier 20. This imbalance is generally constant however and may be filtered by the logic or the FPGA 28.

Then, the output of the differential amplifier 20 is fed into an amplifier 22 and amplified to meet the input range appropriate for the ADC 24. The ADC 24 converts the analog reflected signal into a digital version of the reflected signal at a sampling rate generated by a voltage controlled crystal oscillator 8. The voltage controlled crystal oscillator 8 is also called the VCXO 8. The ADC 24 must support the sampling rate generated by the voltage controlled crystal oscillator 8 with an adequate bit resolution to reconstruct the load 11 with sufficient fidelity.

A voltage controlled crystal oscillator 8 cooperates with an anti jitter circuit, such as a phase-locked loop 6, to provide a sampling clock for the ADC 24 with sufficiently low jitter, which is required to maintain the spatial resolution of the sensed spatial features of the load 11.

The digital reflected signal samples are reassembled by the logic 28 and interleaved by using digital sampling oscilloscope techniques. In an embodiment, equivalent time sampling is used. Due to speed limitations of the ADC 24 and the logic 28, sampling oscilloscope techniques are employed to capture the high frequency reflected signals that are experienced when capturing the required spatial feature resolution. For example, in an embodiment, the spatial feature resolution of 3 inches generates high frequency reflected signals that are experienced when differentiating the load 11 caused by a single wheel versus a dual wheel pair.

Additionally, the logic 28 can average many complete sweeps of the sensor in order to reduce the sensor measurement noise, and the reflected signal caused by the load 11 is differenced from a base-line signal from which the load 11 is known not to be present.

In an embodiment, when weighing a vehicle, for a load 11 caused by a wheel, the apparatus or system of the invention provides the force profile presented by the wheel-width over the time presented by the wheel length. The forces from these orthogonal axes are integrated by the logic 28 to yield the total wheel raw-weight presented. Then, the raw-weight is multiplied by the wheel speed in the direction of travel to compensate for vehicles travelling at varying speeds to yield the actual wheel weight.

Figure 3:
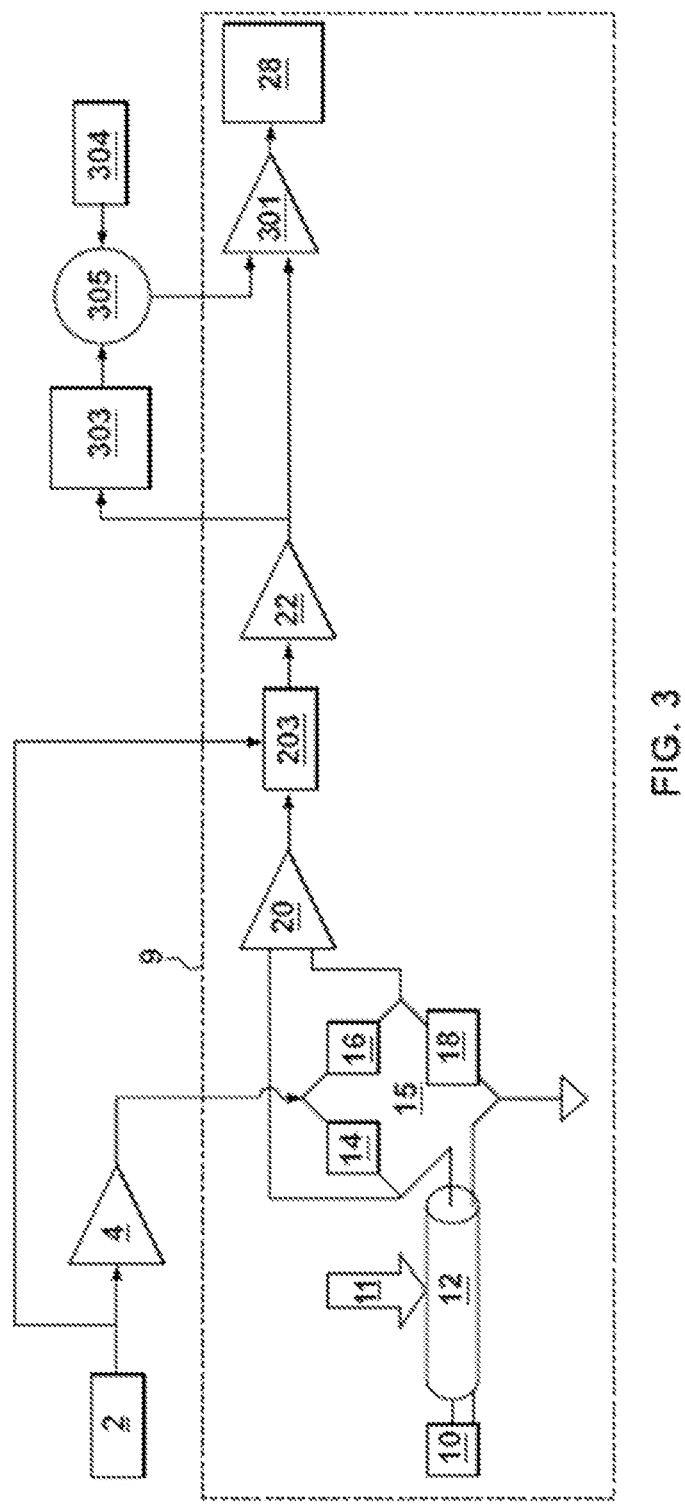
FIG. 3 is a system block diagram of an example embodiment system for determining wheel count.
Figure 4:
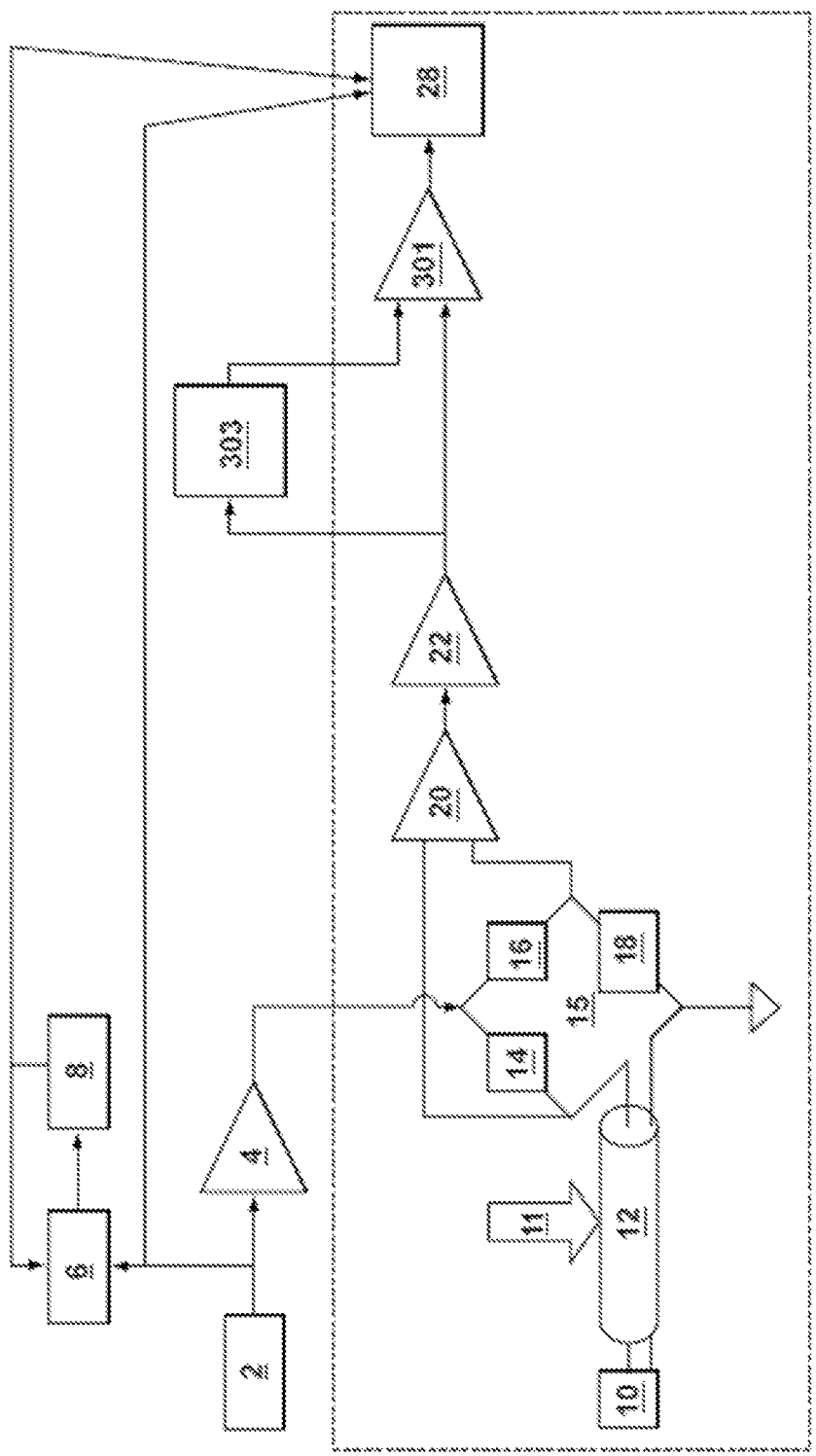
FIG. 4 is a system block diagram of an example embodiment system for determining the spatial profile of a vehicle.

In other embodiments of the invention, only a subset of vehicle data may be desired due to commercial reasons such as cost constraints or product differentiation. In these cases, the embodiments shown in FIGS. 1*a* and 1*b* may be modified so that only the desired vehicle information is obtained or measured. These modifications may, in some embodiments, simplify the implementation of the system. Examples of these aspects and embodiments are shown in FIGS. 2 to 4.

Furthermore, other exemplary embodiments of the apparatus and system as shown in FIGS. 1 to 4 may be used in combination with other non-ETDR sensors to collect road and vehicle information or data. For example, these sensors may be loop presence detectors, temperature sensors, speed sensors, strain gauge or piezoelectric strain sensors, or other sensors known in the art.

Detecting Weight and Axles of Vehicle

Figure 2:
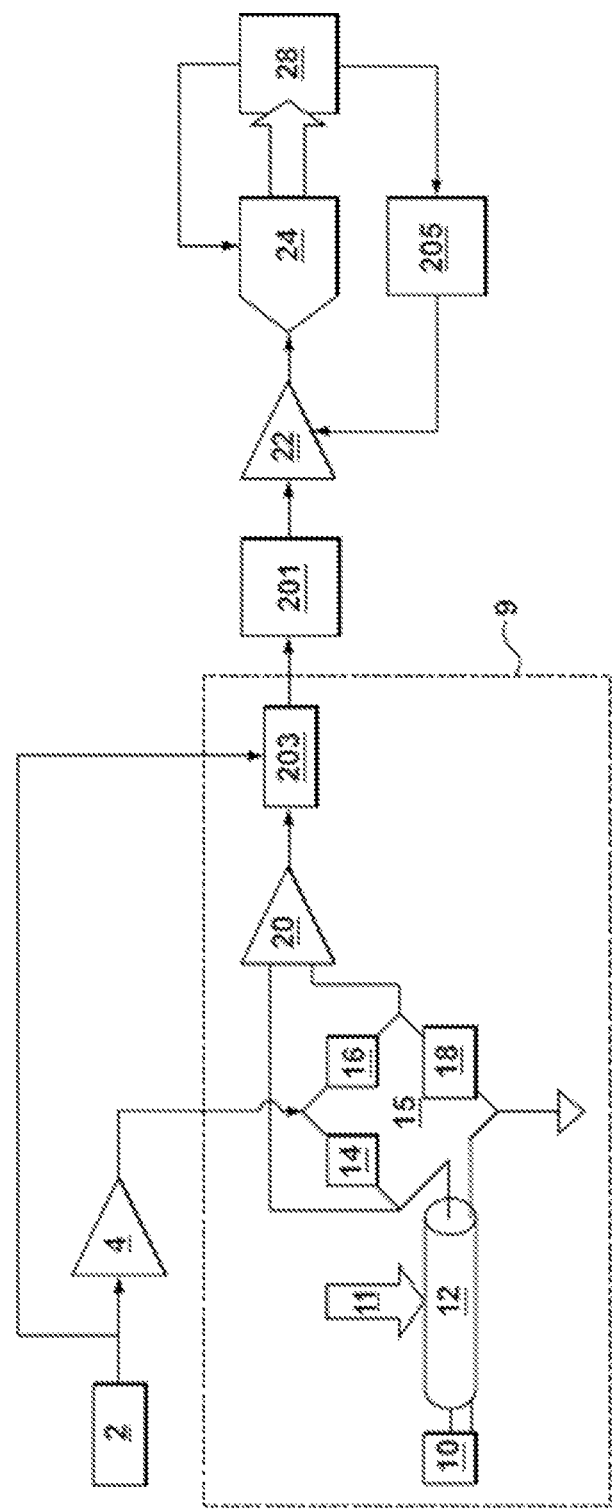
FIG. 2 is a system block diagram of an example embodiment system for determining axle and weight.

Referring now to FIG. 2, there is shown an embodiment of the invention directed towards determining the weight and detecting the axles of a vehicle. If only axle detection and weight information are of interest, system bandwidth can be reduced. This aspect reduces the cost of the device and system. This aspect also does not provide any spatial information along the length of the sensor, or transverse to the roadway, e.g. wheel width, wheel separation. It is still possible to determine spatial information that is longitudinal along the roadway, such as axle separation or inter-axle spacing. Also, in this aspect, there is only a single calibration point for the entire sensor.

In the embodiment shown in FIG. 2, higher edge-rate and bandwidth are required to determine spatial information, in contrast to determining aggregate weight. As the driver edge-rate and bandwidth are reduced, the spatial signature is smeared. This makes it harder to determine spatial information. Note that as bandwidth is reduced, the smearing effect spreads the amplitude over a larger time (space), so that a higher resolution ADC 24 and lower noise floor may be required. Also, the ADC 24 will have a significantly reduced bandwidth and sampling rate requirements.

In the embodiment of FIG. 2, a passive analog integrating low-pass filter 201 is used to integrate all the weight information over the sensor and lead cable, followed by sampling the signal by the ADC 24 at the desired measurement interval. It is understood that LPF stands for low-pass filter. In an embodiment, the interval may be 250 microseconds. This measurement interval can be completely decoupled from the base XO 2. The wheel weight signals are differenced from a base-line signal from which tires are known not to be present.

The driver 4 edge-rate may be reduced to the point where the rise and fall times approach the half period of the base XO 2. This approach increases the complexity of the driver 4 circuitry, but may have the benefit of reducing the required complexity of the components in the bandwidth sensitive area 9.

The reflections seen from the positive and negative half-cycles at the rate of the base XO 2 have opposite polarities, and so will cancel through a low-pass filter 201. The low-pass filter 201 is also called the LPF 201. To account for this, a gate or a gate/hold circuit 203 can be used to integrate only the reflections from the positive or negative half-cycles.

In another embodiment, the wheel-profile integration is performed by a passive analog integrating LPF 201. The passive aspect of this filter integrates while eliminating the otherwise high bandwidth requirements of the amplifier 22. The filter should pass the wheel presence information with a similar timing requirement to that of a piezoelectric sensor interface while suppressing higher frequencies such as those of the base XO 2. A skilled person would know that the LPF of an piezoelectric sensor interface may have a corner frequency of 2 kilohertz.

As shown in FIG. 2, a digital-to-analog converter 205 will be used to provide a reference to the amplifier 22 on which the amplified signal will ride. The digital-to-analog converter 205 is also called the DAC 205. The logic 28 will control the output value of the DAC 205 slowly to remove the aggregate baseline that is tracked over time. Also, in an embodiment of this aspect, the data rate for the logic 28 will be significantly reduced.

The bandwidth requirements for the amplifier 22 are reduced to only that of the wheel presence information as discussed above regarding the LPF 201. Since the wheel width is small relative to the sensor and lead length, deviations from baseline may be small so that a large gain may be required.

Wheel Count Per Axle without Spatial Profiling

Referring now to FIG. 3, there is shown an embodiment of the invention directed towards determining a wheel count per axle of a vehicle without spatial profiling. In this embodiment, the high bandwidth or spatial-resolution signal is split into two paths. The direct signal and a biased LPF signal are compared at the comparator 301 (the comparator may be referred to as CMP 301), and the high-speed logic 28 counts the rising or falling edges to determine the number of tires seen during a cycle of the base XO 2. This aspect provides a count of tires on the sensor but does not discriminate as to their positions along the sensor, i.e. no spatial profiling.

A tracking low-pass filter 303 (LPF) is used to smooth the signal as an estimation of the instantaneous baseline. Then, a bias 304 is added to the baseline signal by the SUM 305 to result in a threshold signal, which when over the threshold signal will cause the comparator 301 to trip. The threshold signal comprises the biased LPF signal.

The direct signal and threshold signal outputs are compared at the comparator 301 so that the output of the comparator 301 activates while the direct signal exceeds the threshold signal. The rising or falling edge of the output of the comparator 301 will clock a counter in the logic 28. The comparator 301 is a high-speed comparator since it is in the bandwidth sensitive area 9.

The counting logic 28 is reset to zero at the start of each measurement period. The difference between the edge-count for the measurement period and a stored count for a period where axles are known to not be present, i.e. the baseline, indicates the number of tires seen.

Spatial Profile of the Wheels on the Sensor

Referring now to FIG. 4, there is shown an embodiment of the invention directed towards determining a spatial profile of the wheels of the vehicle on the sensor. This embodiment maps the wheel contact spatial profile using the equivalent time sampling or VCXO/PLL technique as described in FIG. 1b and a comparator technique similar to that of the wheel-count solution shown in FIG. 3. In this embodiment, the high-speed ADC 24 shown in FIGS. 1a and 1b is eliminated. The direct signal from the amplifier 22 and the signal from the tracking LPF 303 are compared so that the high-speed comparator 301 output activates while the direct signal exceeds the threshold signal. The comparator 301 output, which is binary, is sampled or latched once per cycle of the VCXO 8 to build a complete profile over multiple cycles of the base XO 2. Each point within the profile is summed with its counterpart from subsequent profiles to build a non-binary profile.

In this embodiment, the gate/hold and sum sections of the circuit have been removed. The sensor 12 may be calibrated at every spatial location measured along the sensor 12.

This aspect may be combined with the axle detection and weighing aspect shown in FIG. 2 to allow for individual calibration parameters at each spatial location potentially providing higher fidelity weighing capabilities. But, this combined approach may not have the fidelity as the embodiments of the aspect that is shown in FIG. 1a or 1b, since the weight is aggregated before individual calibration parameters can be applied. However, this combined approach, does provide an opportunity to construct and apply a single calibration parameter that is tailored to the positions and widths of the wheel loads. This combined approach may require making assumptions about the distribution of the load.

In the embodiment shown in FIG. 4, each spatial location has a corresponding up/down counter within the logic 28. Each counter is reset to zero at the start of the measurement period. The active edge of the VCXO 8 clocks one counter either up or down according to the state of the output of the CMP 301. Over multiple measurement periods, points that follow the output of the tracking LPF 303, i.e. no wheel-load, will have a count of roughly zero; while those that deviate, i.e. wheel-loads present, will have a higher value. Instead of simply counting the transitions, this embodiment maps the wheel-sensor contact spatial profile using the VCXO/PLL technique of the embodiment shown in FIG. 1b, and the comparator technique similar to that of the embodiment described in FIG. 3. The output of the comparator 301 is sampled once per cycle of the VCXO 8 to build a complete spatial profile of the sensor over multiple cycles of the base XO 2; this is an implementation of equivalent time sampling. Each point within the profile is summed with its counterpart from subsequent profiles to build a non-binary profile. Points that follow the tracking LPF 303 output, i.e. no wheel-load, will have a sum of roughly zero, while those that deviate, i.e. wheel-loads present, will have a larger value. A digital threshold may be set within the logic 28 to separate loaded from unloaded profile points.

Multiple-Sensor Embodiments of the System and Method

Referring now to FIG. 5a, in an embodiment, there is shown a first PDS port 12a, a second PDS port 12b, and a third PDS port 12c. It is understood that the PDS port 12a is also called the parametric disturbance sensor port 12a. The PDS port 12a, PDS port 12b, and PDS port 12c, are connected to a Wheel Analog Front End 501 via corresponding sensor buses. The Wheel Analog Front End 501 is also called the Wheel AFE 501. The Wheel AFE 501 is connected to the Wheel Data Converter 503 via the receiver bus, and the Wheel AFE 501 is also connected to the FPGA 28 via the sensor selector bus. The Wheel Data Converter 503 is connected to the FPGA 28 via the sample bus, and is connected to the computer 34 via the PLL control bus. A skilled person would understand that various numbers of PDS sensors or PDS sensor ports may be used. The FPGA 28 is connected to the computer via a data bus.

The Loop Port 515 or a loop presence detector port is connected to the Loop Analog Front-End (AFE) 517 via a loop bus. The Loop Analog Front-End 517 is also called the Loop AFE 517. The Loop AFE 517 is connected to the FPGA 28 via the oscillator bus and the computer 34 via the channel selection bus.

The temperature port 519 is connected to the 1-Wire sensor bridge 521 (via a 1-Wire bus), which is connected to the computer 34 via the I2C bus.

The FPGA 28 is connected to the computer 34 via the Data Bus, and the real-time clock 523 via the serial peripheral interface (SPI) bus.

The computer 34 is connected to a transceiver over a serial bus, such as an RS-232 or an RS-422 transceiver 505. The transceiver 505 is also called the XCVR 505. The Serial Port 507 is connected to the XCVR 505 via a serial bus (such as, a RS-232 or RS-422 bus). The computer 34 is also connected to the Secure Digital (SD) Card Port via the SD Bus. The computer 34 is also connected to the Ethernet Port 511 and a Power Over Ethernet device 513 via the Ethernet PMD Bus. POE stands for Power Over Ethernet.

The Wheel AFE 501, the Loop AFE 517, and the POE 513 are analog or mixed signal blocks (modules). The FPGA 28, the Computer 34, the Wheel Data Converter 503, the XCVR 505, the Real-Time Clock 523, and the 1-Wire Sensor Bridge 521 are digital blocks (modules). The Sensor Ports 12a, 12b, and 12c, the Serial Port 507, the SD Card Port 509 (a memory card port), the Loop Port 515, the Temperature Port 519, and the Ethernet Port 511 are connectors.

In an embodiment, the Wheel AFE 501 actively pings each instance of the PDS 12 attached via the sensor ports 12a, 12b, and 12c in succession by the FPGA 28, which provides a sweep clock and processes the received reflected signal.

Figure 5B:
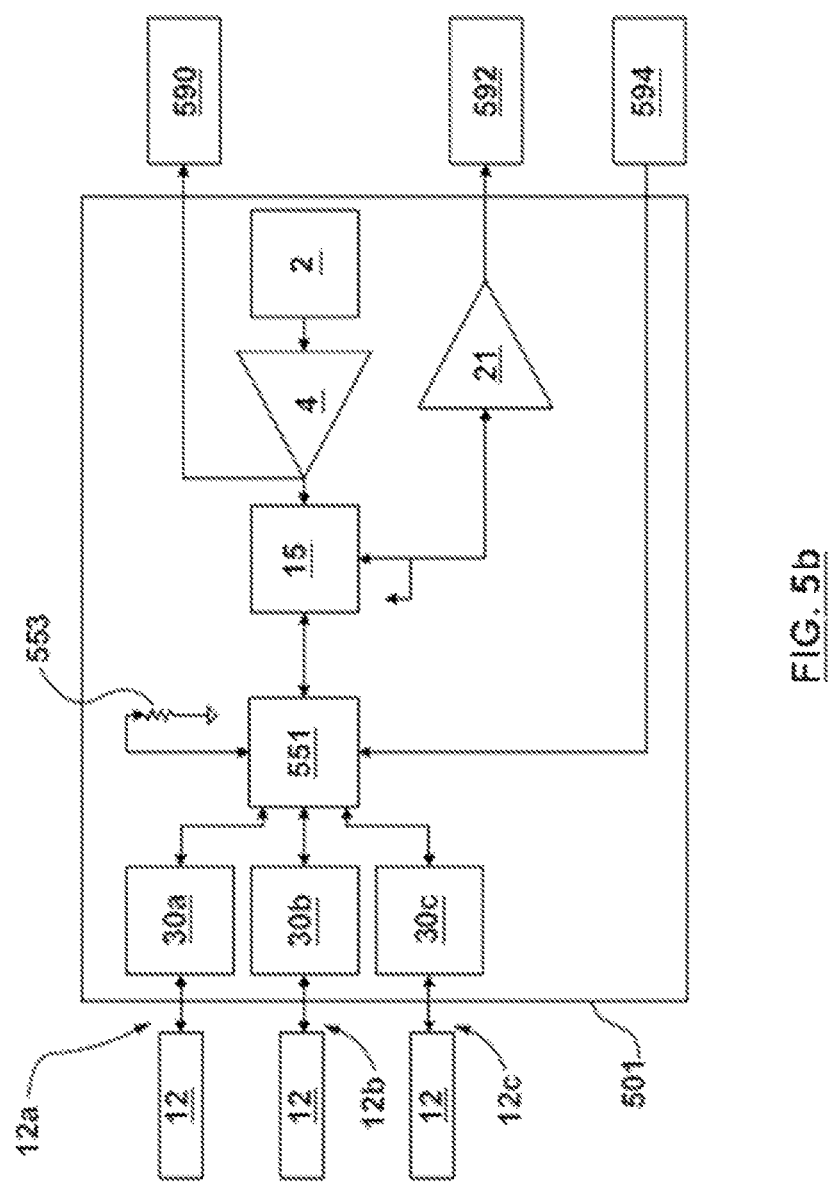
FIG. 5b is a block diagram of an example embodiment of a wheel analog front-end.

Referring to FIG. 5b, in an embodiment of the Wheel AFE 501, three instances of the PDS sensors 12 may be connected via Sensor Ports 12a, 12b and 12c to respective instances of the TVS protection circuitry 30a, 30b, and 30c. The three instances of the PDS sensors 12 or Sensor Ports 12a, 12b, and 12c may be supported by adding a radio-frequency (RF) switch 551. The switch 551 allows for time-division multiplexing between the three instances of the sensor 12 and the reference terminator 553. The switch 551 is also connected to the hybrid circuit 15, and a sensor selection input from the sensor selection bus from the FPGA 28. The reference terminator 553 may be used as a referenced to track variation due to pulse amplitude, supply voltage, or ageing, among other parameters. As depicted, there is provided an output 590 for the sweep clock output (from the driver 4), an output 592 for the receiver output (from the receiver 21), and an input 594 for the sensor selection input signal (for the input of the switch 551).

In another embodiment, the Wheel AFE 501 for interfacing with the 3 sensors or Sensor Ports 12a, 12b, and 12c may be the same as the single sensor implementations shown in FIGS. 1a and 1b with multiple parallel circuit blocks, instead of the switch 551.

The skilled person would understand that in the parallel embodiment, all 3 sensors may be active and sending data, while in the switched version, data is received only when the switch is active for that particular sensor 12.

Sensor

The sensor or parametric disturbance sensor 12 (PDS) is a transmission line. A number of problems are solved by the example of the system of the invention. These may include longevity, the ability to provide spatial information along the length of the sensor 12, the ability to provide positional information on wheels along the length of the sensor 12, the ability to measure wheel pressure, the ability to differentiate individual wheels, the ability to continuously monitor the sensor, the ability to resist or detect interference from wheels of an adjacent vehicle during wheel measurement, and ease of installation. This is in part achieved through the design of the sensor 12.

The design of the sensor 12 takes into account that the bandwidth of a transmission line is reduced the longer the transmission line becomes. Lower bandwidth causes lower minimum feature resolution and more interference between adjacent wheel-loads. Two phenomena cause the reduction in transmission line bandwidth, namely the "skin effect" and dielectric losses.

The skin effect causes conductors to exhibit a frequency dependent resistance, due to the self-inductance of the conductor. This causes the rise-time and dispersion of the transmission line to increase with the square of the transmission line length. This band-limiting has the undesired effect of causing wheels on the sensor to interfere with one another, due to inter-symbol interference. The way to reduce the rise-time without shortening the transmission line length is to reduce the resistance of the transmission line, which is accomplished by using a highly conductive material, and with larger surface area geometries.

Dielectric losses are caused by dissipation in the dielectric material. The amount of dissipation is determined by the loss tangent, and varies by material. This effect causes an increase in the rise-time and dispersion that is proportional to the transmission length. In order to mitigate this problem, a low loss dielectric material must be chosen.

Another problem the sensor solves is the ability to provide an approximately linear response, or characterizable response, to the weight of wheel-loads seen from vehicles such as trucks and cars. The limitations overcome are that the sensor 12 has to provide the linear response with sufficient bandwidth for the system to resolve the desired level of detail.

Problems that the sensor design has overcome are durability and reliability issues that arise when deployed in real world conditions for long periods of time. There is also consideration of manufacturability issues, and road infrastructure impacts. For example, the sensor is deployed in roadways and exposed to all weather conditions. The sensor has to survive and be reliable when it is driven over by vehicles such as cars and trucks continuously over long periods of time. The periods of time may be years or longer.

In one aspect, for example, a practical limitation is the ability to span one full lane of traffic with a sensor length of 13 feet. Another practical limitation is the ability to resolve a single tire from a dual tire pair, which has a gap of about 6 inches. This may require a spatial resolution of less than 3 inches which the system is able to provide.

In an embodiment, the sensor is designed with a 50 ohm nominal characteristic impedance. The range of the change in impedance over the expected wheel-load pressure range is less than 2 ohms. In an embodiment, the system electronics are capable of seeing or measuring an impedance change over the range of 10 ohms.

Figure 6B:
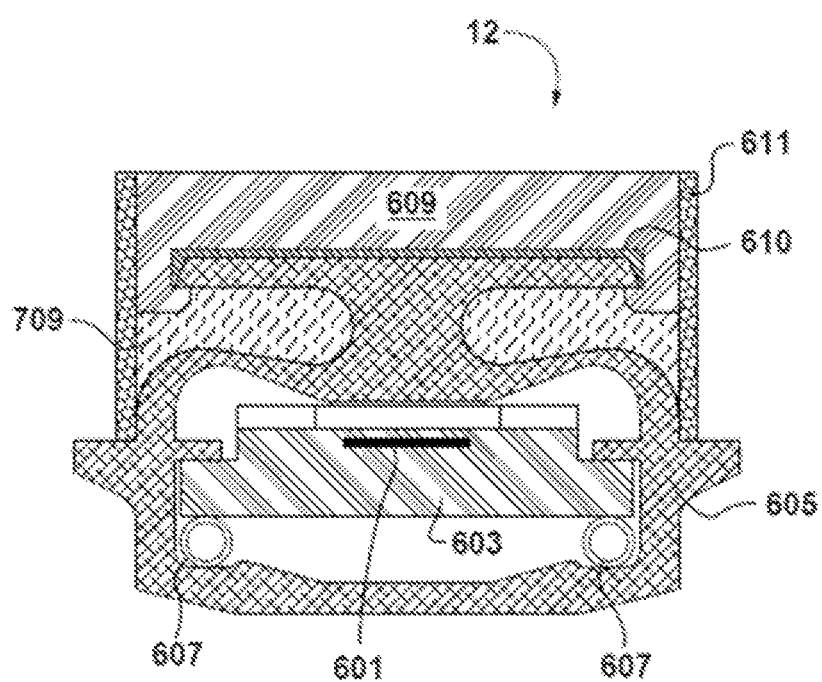

Referring now to FIGS. 6a-6c, there is shown an embodiment of the PDS 12. In the embodiment shown, the overall dimensions are much larger than a typical coaxial cable design, about 1.5 inches high by 2.25 inches wide by about the length of a lane in a road. The main purpose of the larger surface area was to reduce the skin effect issues that would affect the ability to obtain high resolution information. A skilled person would understand that a suitable PDS 12 or transmission line may have variations in the materials chosen for construction, shape, size, and other physical attributes that may be varied to meet the requirements of the overall device, system, or method.

In this embodiment, there is shown a PDS 12 or transmission line comprising a sensor core 601 in a sensor carrier 603. The sensor carrier 603 is housed in the sensor carrier extrusion housing 605. The sensor carrier extrusion housing 605 is a metallic shield which surrounds the sensor core 601 and sensor carrier 603. The sensor carrier 603 may be supported or stabilized in the sensor carrier extrusion housing 605 by a support tubing 607. The top of the sensor carrier extrusion housing 605 is covered and/or protected by the cap extrusion 609. The cap extrusion 609 is connected to the sensor carrier extrusion housing 605 by adhesive 610. The sensor core 601 may be a half hard copper strip, and the sensor carrier extrusion housing 605 may be made of aluminum. The dielectric is a combination of air and the material of the sensor carrier 603, for example, the sensor carrier 603 may be made of polyethylene. A skilled person would understand that other materials suitable for use in a transmission line may be used, such as aluminum, copper, high density polyethylene, although reliability and durability issues may need to be addressed. The adhesive 610 may be a urethane sealer.

Load from the vehicle's wheels are applied to the cap extrusion 609, which may be mounted flush in the roadway, as a raised surface in the roadway, or above the roadway as required by the aspect or embodiment of the invention. The load is then transferred to the sensor carrier exterior housing 605 via the cap extrusion 609. In an embodiment, the sensor carrier extrusion housing 605 construction material was chosen to be aluminum. Aluminum is a good choice from an electrical signal perspective, other than copper, since sensor carrier extrusion housing would act as the outer conductor of the transmission line sensor, or the PDS 12. Aluminum was also chosen for the mechanical properties related to strength and continuous load cycling, since copper does not have the higher strength properties that are required for these purposes.

The top flat portion of the sensor carrier extrusion housing 605 allows the transmission of the wheel load, while retaining multi-tire recognition, e.g. the wheel load from a dual wheel axle. The cap extrusion 609 is designed as a wearing surface in the road that would limit any effects from the gradual wearing away of the surface of the road and sensor carrier extrusion housing 605 without any detrimental measurement impacts. The isolation foam 611 allows the PDS 12 to measure the true force from the wheel by preventing the road encapsulant or grout 705 (depicted in FIG. 7*f*) from bonding to the side surface of the cap extrusion 609 and impacting the amount of deflection seen by the PDS 12.

The PDS 12 is connected to the system or device via a wire assembly or cable that is attached at connector 615. The connector 615 and the rest of the sensor 12 are connected and interface at the termination block 617. The details of the connection and interface are described below.

Figure 7B:
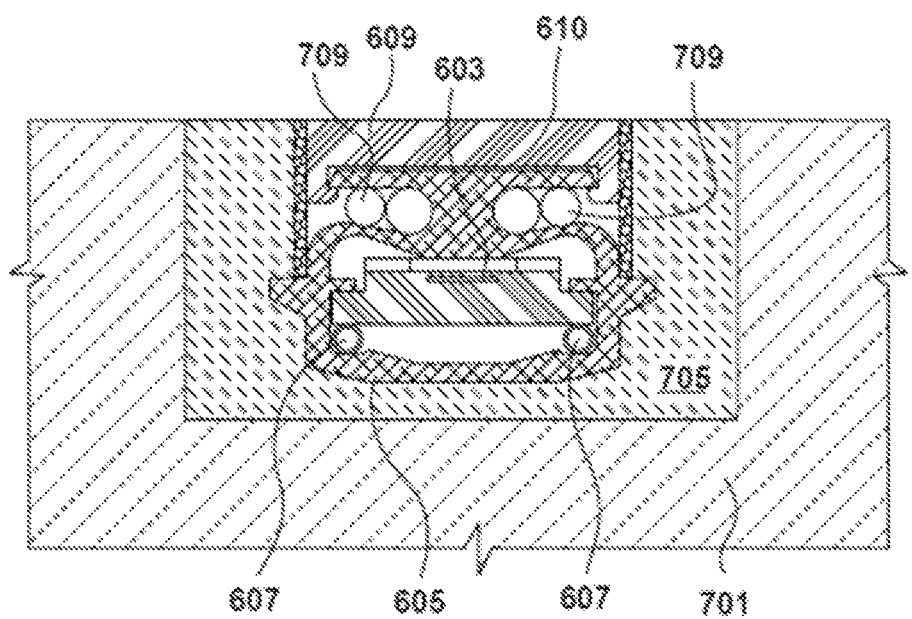
Figure 7C:
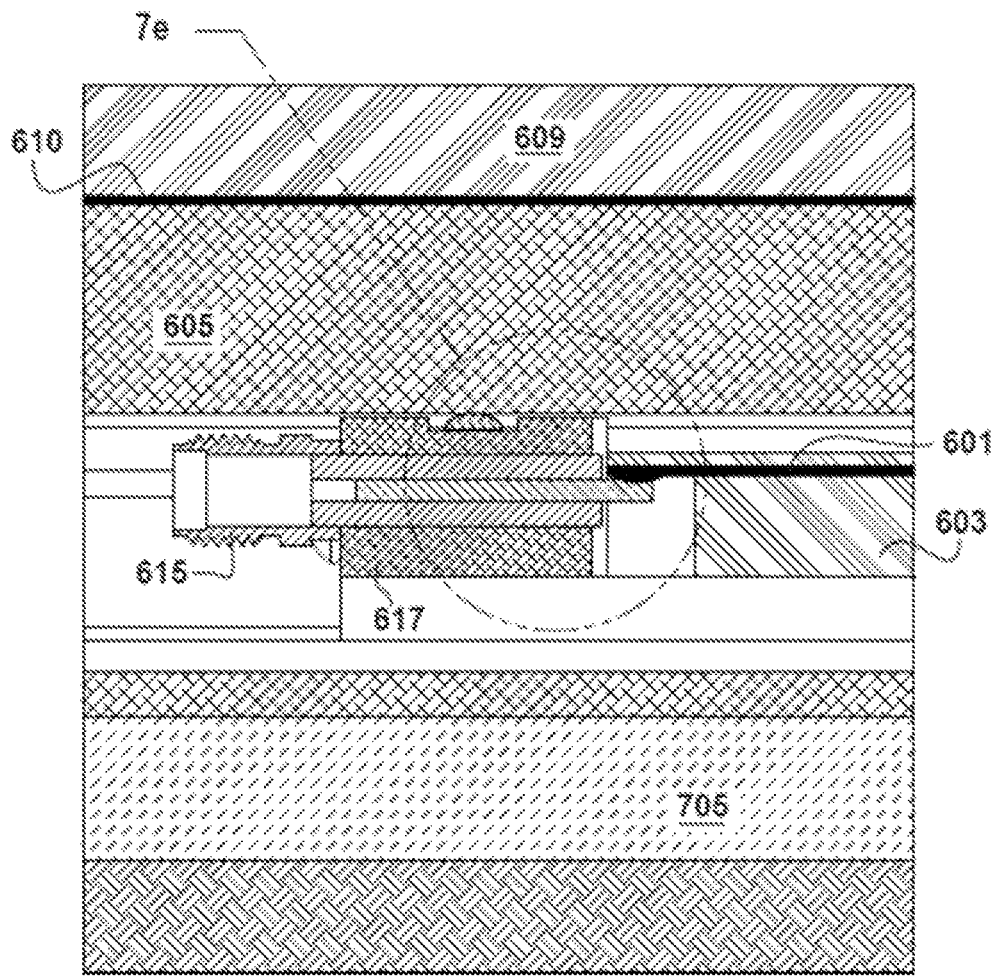
Figure 7D:
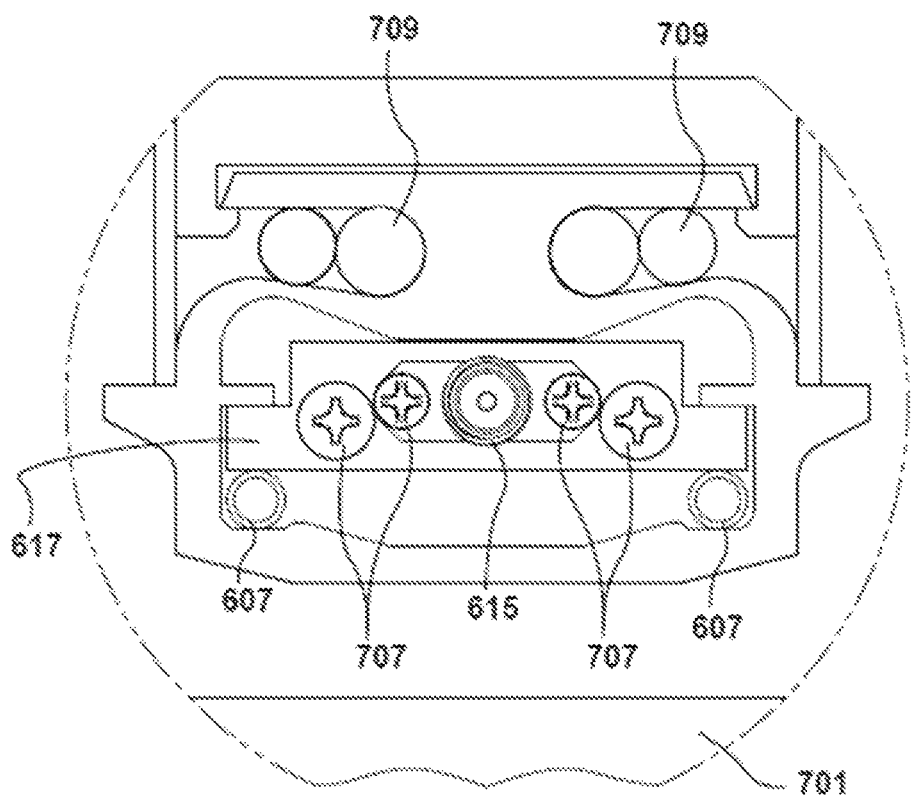
Figure 7E:
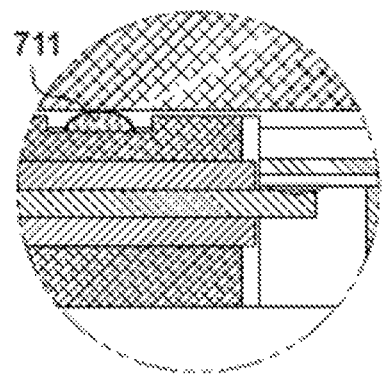
Figure 7F:
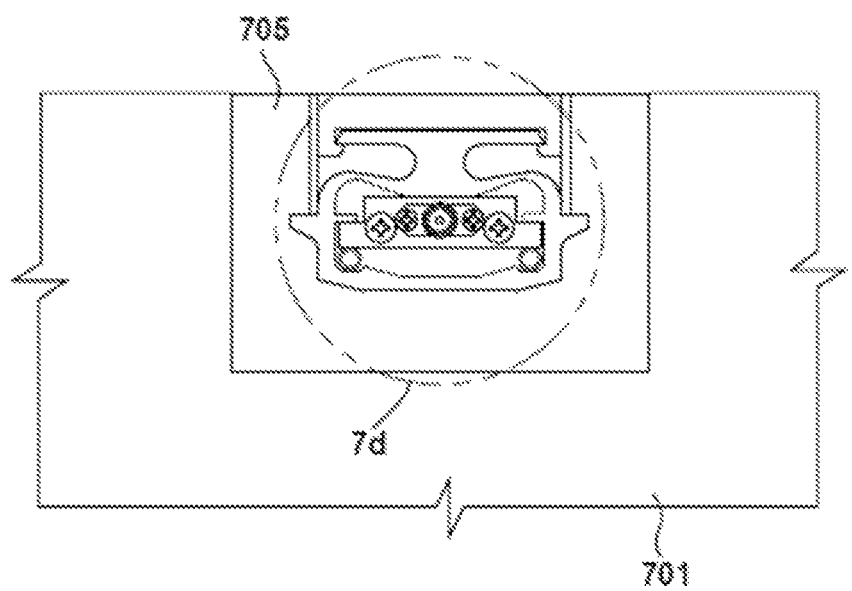

Referring now to FIGS. 7*a*-7*f*, there is shown an embodiment of the PDS 12. The end view shows the PDS 12 mounted in concrete, and held in place by grout 705. FIG. 7*d* shows connector 615 screwed in by screws 707 into the termination block 617 with the termination block screwed into the sensor carrier 603 (depicted in FIG. 7*c*) using screws 707. FIG. 7*b* shows a section of the PDS 12 as it is mounted in the roadway 701. The roadway 701 may include any type of roadway material or materials having, for example, concrete, asphalt, etc. The closed cell foam 709 runs along the length of the sensor carrier extrusion housing 605. The foam 709 acts as filler to prevent contaminants from entering the gap and causing undesired bridging between the top, flat portion of the extrusion housing and the angled corners below. It is desirable that all the force be transferred through the center column of the extrusion housing.

FIG. 7*c* shows an embodiment of how the connector 615, termination block 617, and sensor core 601 may be connected. The connector 615 is connected, as understood by a skilled person, to both the sensor core 601 and sensor carrier extrusion housing 605. FIG. 7*c* shows an electromagnetic interference (EMI) gasket 711 (depicted in FIG. 7*e*) that assists in providing an electrical contact point between the termination block 617 and the sensor carrier extrusion housing 605.

In the embodiment shown, the PDS 12 design addresses the mechanical and electrical requirements of the ETDR device and system. The overall shape and size of the PDS 12 design may be limited by manufacturing constraints, and industry standards or industry expectations regarding acceptable sensor size. A skilled person would understand that these manufacturing and/or industry requirements may change, and that variations in the mechanical and electrical requirements for the PDS 12 are acceptable, as long as they meet the minimum requirements set out by the overall design for the device, system and method.

FIGS. 7*g* to 7*j* depict examples of data images from vehicle data provided by the sensor 12 to the electrical time domain reflectometry signal processing system (906).

Figure 7G:
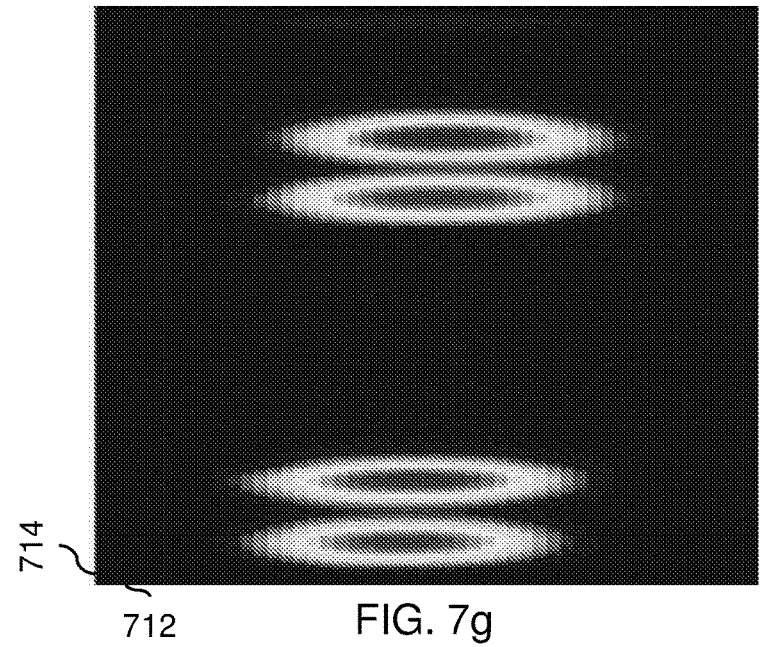
FIGS. 7g-7j depict examples of data images from vehicle data provided by the sensor 12 to the electrical time domain reflectometry signal processing system (906).
Figure 7H:
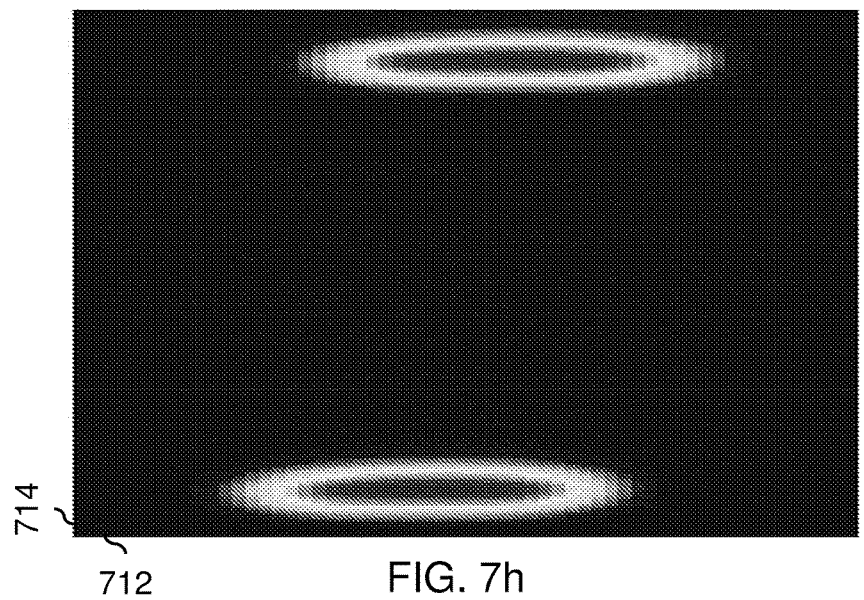
Figure 7I:
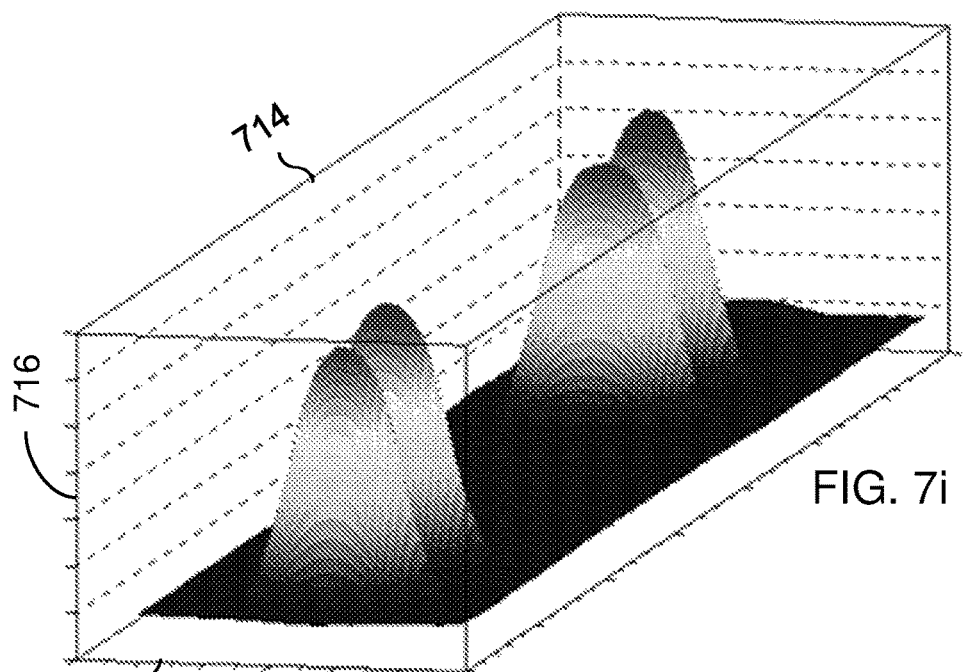
Figure 7J:
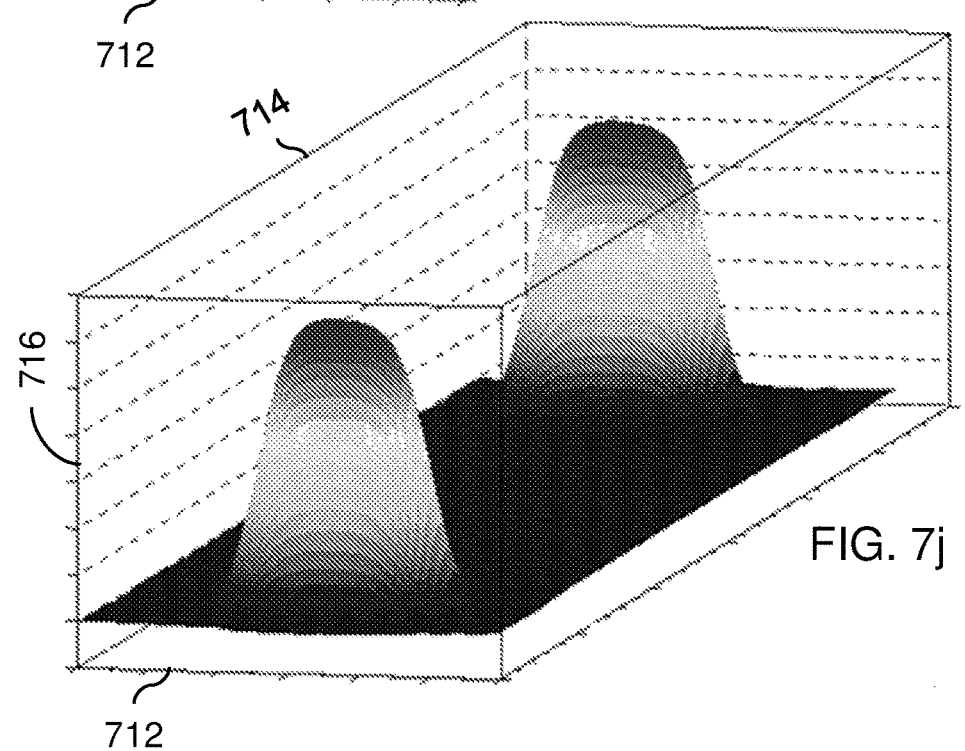

The x-axis 712 represents time, the y-axis 714 represents the distance along a longitudinal length of the sensor 12, and the Z-axis 716 represents impedance change of the sensor 12. FIG. 7*g* depicts two dimensional (2D) data images for an axle with dual tires. FIG. 7*h* depicts two dimensional (2D) data images for an axle with single tires. FIG. 7*i* depicts three dimensional (3D) data images for an axle with dual tires. FIG. 7*j* depicts three dimensional (3D) data images for an axle with single tires. The plots visualize the impedance change in time slices as the vehicle drives across the sensor 12.

The following provides a description of a manner in which vehicle speed may be derived by using a single instance of the sensor 12. It will be appreciated that the speed measurement may be derived or received from two instances of the sensor 12, or the speed measurement may be derived or received from other sensors (depending on the level of accuracy and repeatability desired). The speed measurement may also be determined by using a single instance of the sensor 12. Referring to FIGS. 7*g*, 7*h*, 7*i* and 7*j*, a skilled person would understand that as a wheel rolls onto the sensor 12, the area that the load of the vehicle applies to the sensor 12 (through the wheel) increases over time from no load to a fully applied load. This is shown in FIGS. 7*g* and 7*h*, by how the width of the applied load is narrow at the leading edge and widens out until the load reaches a maximum width. A skilled person would therefore understand that by determining the horizontal distance between where the load is first applied and where the load reaches its greatest width, the vehicle speed may be derived. Assuming, constant velocity of the vehicle and/or wheels as they move over the sensor 12.

Additional Description

The following clauses are offered as further description of the examples of a system (or an apparatus). Any one or more of the following clauses may be combinable with any another one or more of the following clauses and/or with any subsection or a portion or portions of any other clause and/or combination and permutation of clauses. Any one of the following clauses may stand on its own merit without having to be combined with any other clause or with any portion of any other clause, etc. Clause (1): a system or apparatus (either taken alone, or with a system or apparatus of any clause mentioned in this paragraph, or any portion of any clause mentioned in this paragraph), the system or apparatus for measuring moving vehicle information of a moving vehicle, the system or apparatus including: an electrical time domain reflectometry signal processing system being capable of measuring a change in an impedance of a sensor, and also being capable of converting the change in the impedance of the sensor to a signal; and a data-processing system being capable of extracting the moving vehicle information from the signal. Clause (2): a system or apparatus (either taken alone, or with a system or apparatus of any clause mentioned in this paragraph, or any portion of any clause mentioned in this paragraph), wherein the sensor is configured to respond to at least one wheel of the moving vehicle, where said at least one wheel causes the change in the impedance of the sensor. Clause (3): a system or apparatus (either taken alone, or with a system or apparatus of any clause mentioned in this paragraph, or any portion of any clause mentioned in this paragraph), wherein the moving vehicle information comprises any one of a wheel pressure and a wheel-sensor contact dimension. Clause (4): a system or apparatus (either taken alone, or with a system or apparatus of any clause mentioned in this paragraph, or any portion of any clause mentioned in this paragraph), wherein the wheel-sensor contact dimension comprises at least one of a width of a wheel-sensor contact, a location of the wheel-sensor contact along the sensor, and a wheel-sensor contact duration. Clause (5): a system or apparatus (either taken alone, or with a system or apparatus of any clause mentioned in this paragraph, or any portion of any clause mentioned in this paragraph), wherein: the moving vehicle information comprises at least one of an axle detection, a vehicle presence detection, a single tire detection, a multi-tire detection, a wheel count, and an axle width. Clause (6): a system or apparatus (either taken alone, or with a system or apparatus of any clause mentioned in this paragraph, or any portion of any clause mentioned in this paragraph), further comprising a speed measuring system for measuring a speed of the moving vehicle. Clause (7): a system or apparatus (either taken alone, or with a system or apparatus of any clause mentioned in this paragraph, or any portion of any clause mentioned in this paragraph), wherein: the moving vehicle information further comprises at least one of a wheel-road contact patch length, a weight of an individual wheel, a weight of the moving vehicle, and an inter-axle spacing. Clause (8): a system or apparatus (either taken alone, or with a system or apparatus of any clause mentioned in this paragraph, or any portion of any clause mentioned in this paragraph), wherein the data-processing system is configured to determine a wheel-road contact patch length from the speed of the moving vehicle and a wheel-sensor contact duration. Clause (9): a system or apparatus (either taken alone, or with a system or apparatus of any clause mentioned in this paragraph, or any portion of any clause mentioned in this paragraph), wherein the data-processing system is configured to determine the weight of the individual wheel from the speed of the moving vehicle, the wheel pressure, the wheel-sensor contact width, and the wheel-sensor contact duration. Clause (10): a system or apparatus (either taken alone, or with a system or apparatus of any clause mentioned in this paragraph, or any portion of any clause mentioned in this paragraph), the system or apparatus for measuring information about a moving vehicle, including an electrical time domain reflectometry data processing system for extracting the information about the moving vehicle from a reflected electrical signal. Clause (11): a system or apparatus (either taken alone, or with a system or apparatus of any clause mentioned in this paragraph, or any portion of any clause mentioned in this paragraph), further comprising: a sensor whose impedance changes in response to an applied load associated with the moving vehicle; a signal source for transmitting an electrical signal along the sensor; and a receiver for measuring the reflected electrical signal reflected by the sensor, and the reflected electrical signal caused by an impedance change of the sensor. Clause (12): a system or apparatus (either taken alone, or with a system or apparatus of any clause mentioned in this paragraph, or any portion of any clause mentioned in this paragraph), wherein the applied load is at least one wheel of the moving vehicle. Clause (13): a system or apparatus (either taken alone, or with a system or apparatus of any clause mentioned in this paragraph, or any portion of any clause mentioned in this paragraph), wherein the information comprises any one of a wheel pressure and a wheel-sensor contact dimension. Clause (14): a system or apparatus (either taken alone, or with a system or apparatus of any clause mentioned in this paragraph, or any portion of any clause mentioned in this paragraph), wherein the wheel-sensor contact dimension comprises at least one of a width of a wheel-sensor contact, a location of the wheel-sensor contact along the sensor, and a wheel-sensor contact duration, an axle width, and an inter-axle spacing. Clause (15): a system or apparatus (either taken alone, or with a system or apparatus of any clause mentioned in this paragraph, or any portion of any clause mentioned in this paragraph), wherein the information comprises at least one of an axle detection, a vehicle presence detection, a single tire detection, a multi-tire detection, a wheel count, and an axle width. Clause (16): a system or apparatus (either taken alone, or with a system or apparatus of any clause mentioned in this paragraph, or any portion of any clause mentioned in this paragraph), further comprising a speed measuring system for measuring a speed of the moving vehicle. Clause (17): a system or apparatus (either taken alone, or with a system or apparatus of any clause mentioned in this paragraph, or any portion of any clause mentioned in this paragraph), wherein the information further comprises at least one of a wheel-road contact patch length, the weight of an individual wheel, the weight of the moving vehicle, and an inter-axle spacing. Clause (18): a system or apparatus (either taken alone, or with a system or apparatus of any clause mentioned in this paragraph, or any portion of any clause mentioned in this paragraph), wherein a data-processing system is configured to determine the wheel-road contact patch length from the speed of the moving vehicle and a wheel-sensor contact duration. Clause (19): a system or apparatus (either taken alone, or with a system or apparatus of any clause mentioned in this paragraph, or any portion of any clause mentioned in this paragraph), wherein the data-processing system is configured to determine the weight of the individual wheel from the speed of the moving vehicle, a wheel pressure, a wheel-sensor contact width, and the wheel-sensor contact duration. Clause (20): a system or apparatus (either taken alone, or with a system or apparatus of any clause mentioned in this paragraph, or any portion of any clause mentioned in this paragraph), wherein the electrical signal is any one of a pulse and a series of pulses. Clause (21): a system or apparatus (either taken alone, or with a system or apparatus of any clause mentioned in this paragraph, or any portion of any clause mentioned in this paragraph), wherein the sensor is (includes) an electrical transmission line (transmission line). Clause (22): a system or apparatus (either taken alone, or with a system or apparatus of any clause mentioned in this paragraph, or any portion of any clause mentioned in this paragraph), wherein the sensor is a controlled impedance transmission line (a controlled impedance electrical transmission line). Clause (23): a system or apparatus (either taken alone, or with a system or apparatus of any clause mentioned in this paragraph, or any portion of any clause mentioned in this paragraph), wherein the sensor is any one of a coaxial cable, a twin-axial cable, a stripline circuit, and a microstrip circuit. Clause (24): a system or apparatus (either taken alone, or with a system or apparatus of any clause mentioned in this paragraph, or any portion of any clause mentioned in this paragraph), wherein a range of a change in the impedance of the sensor is 2 ohms. Clause (25): a system or apparatus (either taken alone, or with a system or apparatus of any clause mentioned in this paragraph, or any portion of any clause mentioned in this paragraph), wherein the sensor is located within a block of resilient material for placement under a load associated with the moving vehicle. Clause (26): a system or apparatus (either taken alone, or with a system or apparatus of any clause mentioned in this paragraph, or any portion of any clause mentioned in this paragraph), wherein the sensor is configured to be embedded within a road. Clause (27): a method (either taken alone, or with a method of any clause mentioned in this paragraph, or any portion of any clause mentioned in this paragraph), of any clause mentioned in this paragraph, the method for measuring moving vehicle information of a moving vehicle, and the method including measuring a change in an impedance of a sensor, as the sensor is loaded by the moving vehicle, using electrical time domain reflectometry signal processing. Clause (28): a method (either taken alone, or with a method any clause mentioned in this paragraph, or any portion of any clause mentioned in this paragraph), further comprising: converting the change in the impedance to a signal; and extracting the moving vehicle information from the signal by processing the signal. Clause (29): a method (either taken alone, or with a method any clause mentioned in this paragraph, or any portion of any clause mentioned in this paragraph), wherein the change in the impedance of the sensor is caused by at least one wheel of the moving vehicle. Clause (30): a method (either taken alone, or with a method any clause mentioned in this paragraph, or any portion of any clause mentioned in this paragraph), wherein the moving vehicle information comprises any one of a wheel pressure and a wheel-sensor contact dimension. Clause (31): a method (either taken alone, or with a method any clause mentioned in this paragraph, or any portion of any clause mentioned in this paragraph), wherein the wheel-sensor contact dimension comprises at least one of a width of a wheel-sensor contact, a location of the wheel-sensor contact along the sensor, and a wheel-sensor contact duration. Clause (32): a method (either taken alone, or with a method any clause mentioned in this paragraph, or any portion of any clause mentioned in this paragraph), wherein the moving vehicle information comprises at least one of an axle detection, a vehicle presence detection, a single tire detection, a multi-tire detection, a wheel count, and an axle width. Clause (33): a method (either taken alone, or with a method any clause mentioned in this paragraph, or any portion of any clause mentioned in this paragraph), further comprising measuring a speed of the moving vehicle. Clause (34): a method (either taken alone, or with a method any clause mentioned in this paragraph, or any portion of any clause mentioned in this paragraph), wherein the moving vehicle information further comprises at least one of a wheel-road contact patch length, a weight of an individual wheel, a weight of the moving vehicle, and an inter-axle spacing. Clause (35): a method (either taken alone, or with a method any clause mentioned in this paragraph, or any portion of any clause mentioned in this paragraph), wherein a data-processing system is configured to determine the wheel-road contact patch length from the speed of the moving vehicle and the wheel-sensor contact duration. Clause (36): a method (either taken alone, or with a method any clause mentioned in this paragraph, or any portion of any clause mentioned in this paragraph), wherein determining the weight of the individual wheel from the speed of the moving vehicle, the wheel pressure, a wheel-sensor contact width, and the wheel-sensor contact duration. Clause (37): a system or apparatus (either taken alone, or with a system or apparatus of any clause mentioned in this paragraph, or any portion of any clause mentioned in this paragraph), including: a sensor, having: a characteristic impedance being configured to change in response to a wheel of a moving vehicle moving relative to the sensor; and an interface being configured to interface the characteristic impedance with an electrical time domain reflectometry signal processing system. Clause (38): a system or apparatus (either taken alone, or with a system or apparatus of any clause mentioned in this paragraph, or any portion of any clause mentioned in this paragraph), wherein the electrical time domain reflectometry signal processing system is configured to: measure a change in an impedance of the sensor; convert the change in the impedance of the sensor to a signal; and provide the signal to a data-processing system being configured to extract the moving vehicle information from the signal. Clause (39): a system or apparatus (either taken alone, or with a system or apparatus of any clause mentioned in this paragraph, or any portion of any clause mentioned in this paragraph), wherein the sensor has the characteristic impedance being configured to provide a reflected electrical signal that travels from a source of an impedance mismatch in a transmission line (electrical transmission line) to a receiver. Clause (40): a system or apparatus (either taken alone, or with a system or apparatus of any clause mentioned in this paragraph, or any portion of any clause mentioned in this paragraph), wherein the sensor includes: a signal source being configured to transmit an electrical signal along the sensor; a receiver being configured to measure a reflected electrical signal being reflected by the sensor, and the reflected electrical signal being caused by a change in the characteristic impedance of the sensor. Clause (41): a system or apparatus (either taken alone, or with a system or apparatus of any clause mentioned in this paragraph, or any portion of any clause mentioned in this paragraph), wherein the sensor includes a transmission line (such as an electrical transmission line). Clause (42): a system or apparatus (either taken alone, or with a system or apparatus of any clause mentioned in this paragraph, or any portion of any clause mentioned in this paragraph), wherein the sensor includes a controlled impedance transmission line. Clause (43): a system or apparatus (either taken alone, or with a system or apparatus of any clause mentioned in this paragraph, or any portion of any clause mentioned in this paragraph), wherein the sensor includes any one of a coaxial cable, a twin-axial cable, a stripline circuit, and a microstrip circuit. Clause (44): a system or apparatus (either taken alone, or with a system or apparatus of any clause mentioned in this paragraph, or any portion of any clause mentioned in this paragraph), wherein a range of a change in the characteristic impedance about 2 ohms. Clause (45): a system or apparatus (either taken alone, or with a system or apparatus of any clause mentioned in this paragraph, or any portion of any clause mentioned in this paragraph), wherein the sensor is located within a block of resilient material for placement under the moving vehicle. Clause (46): a system or apparatus (either taken alone, or with a system or apparatus of any clause mentioned in this paragraph, or any portion of any clause mentioned in this paragraph), wherein the sensor is configured to be embedded within a road. Clause (47): a system or apparatus (either taken alone, or with a system or apparatus of any clause mentioned in this paragraph, or any portion of any clause mentioned in this paragraph), further comprising: a signal source being configured to transmit an electrical signal along the sensor; and a receiver being configured to measure a reflected electrical signal being reflected by the sensor, and the reflected electrical signal being caused by an impedance change of the sensor. Clause (48): a system or apparatus (either taken alone, or with a system or apparatus of any clause mentioned in this paragraph, or any portion of any clause mentioned in this paragraph), wherein: the sensor also includes: a transmission line being configured to be integrated into a roadway so that a vehicle passes over the sensor, and the force exerted on the sensor, due to the weight of the passing wheel of the vehicle, causes a deflection in the transmission line, thereby affecting the impedance of the transmission line where the force is applied, and the impedance change is configured to be measured using an electrical time domain reflectometry signal processing technique in such a way that vehicle information is extractable from the measured impedance changes. Clause (49): a system or apparatus (either taken alone, or with a system or apparatus of any clause mentioned in this paragraph, or any portion of any clause mentioned in this paragraph), wherein: the sensor also includes: a transmission line including: a sensor carrier extrusion housing; a sensor core in a sensor carrier being housed in the sensor carrier extrusion housing, the sensor carrier extrusion housing including a metallic shield surrounding the sensor core and the sensor carrier; and a cap extrusion being configured to cover the sensor carrier extrusion housing, and whereby a wheel load from the wheel of the vehicle is applied to the cap extrusion, and the load is then transferred to the sensor carrier exterior housing via the cap extrusion. Clause (50): a system or apparatus (either taken alone, or with a system or apparatus of any clause mentioned in this paragraph, or any portion of any clause mentioned in this paragraph), wherein: the sensor also includes: a top flat portion of the sensor carrier extrusion housing is configured to allow transmission of a wheel load. Clause (51): a system or apparatus (either taken alone, or with a system or apparatus of any clause mentioned in this paragraph, or any portion of any clause mentioned in this paragraph), wherein: the sensor also includes: an isolation foam being configured to allow the sensor to measure the true force from the wheel by preventing a road encapsulant from bonding to a surface of the cap extrusion and impacting the amount of deflection seen by the sensor. Clause (52): a method (either taken alone, or with a method any clause mentioned in this paragraph, or any portion of any clause mentioned in this paragraph) of a sensor, the method comprising: having a characteristic impedance being configured to change in response to a wheel of a moving vehicle moving relative to the sensor; and interfacing the characteristic impedance with an electrical time domain reflectometry signal processing system. Clause (53): a system or apparatus (either taken alone, or with a system or apparatus of any clause mentioned in this paragraph, or any portion of any clause mentioned in this paragraph), wherein the data-processing system is further configured to determine the weight of the moving vehicle from the weight of the individual wheels of the moving vehicle. Clause (54): a system or apparatus (either taken alone, or with a system or apparatus of any clause mentioned in this paragraph, or any portion of any clause mentioned in this paragraph), wherein the data-processing system is further configured to determine the weight of the moving vehicle from the weight of the individual wheels of the moving vehicle. Clause (55): a method (either taken alone, or with a method any clause mentioned in this paragraph, or any portion of any clause mentioned in this paragraph), wherein determining the weight of the moving vehicle from the weight of the individual wheels of the moving vehicle.

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, or components, that are superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) the description provided outside of this document (that is, outside of the instant application as filed, as prosecuted, and/or as granted). It is understood, for the purposes of this document, that the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A system for measuring moving vehicle information, comprising:
   an electrical transmission-line sensor configured to provide an impedance change in response to a wheel-load of a moving vehicle;
   an electrical time domain reflectometry signal processing system capable of measuring the impedance change of the electrical transmission-line sensor and converting the impedance change to a signal; and
   a data-processing system capable of extracting the moving vehicle information of the moving vehicle from the signal
   wherein:
   the impedance change is caused by a change in a geometry of the electrical transmission-line sensor; and
   the moving vehicle information comprises any one of a wheel pressure and a wheel-sensor contact dimension.

2. The system of claim 1, wherein:
   the wheel-sensor contact dimension comprises at least one of a width of a wheel-sensor contact, a location of the wheel-sensor contact along the electrical transmission-line sensor, and a wheel-sensor contact duration.

3. The system of claim 1, wherein:
   the moving vehicle information comprises at least one of an axle detection, a vehicle presence detection, a single tire detection, a multi-tire detection, a wheel count, an axle width, a wheel-road contact patch length, a weight of an individual wheel, a weight of the vehicle, and an inter-axle spacing.

4. The system of claim 1, wherein:
   the data-processing system is configured to determine any one of: the wheel-road contact patch length from a speed of the moving vehicle and the wheel-sensor contact duration;
   the weight of the individual wheel from the speed of the vehicle, the wheel pressure, the wheel-sensor contact width, and the wheel-sensor contact duration;
   the weight of the moving vehicle from the weight of the individual wheels of the moving vehicle; or
   a wheel position or an axle position of the moving vehicle on a vehicular roadway from the location of the wheel-sensor contact along the electrical transmission-line sensor.

5. An apparatus for measuring information about a moving vehicle comprising:
   an electrical time domain reflectometry data processing system for extracting information about the vehicle from a reflected electrical signal;
   an electrical transmission-line sensor configured to provide an impedance change in response to a wheel-load of the moving vehicle;
   a signal source for transmitting an electrical signal along the electrical transmission-line sensor; and
   a receiver for measuring the reflected electrical signal reflected by the electrical transmission-line sensor, the reflected electrical signal being caused by the impedance change of the electrical transmission-line sensor;
   wherein:
   the impedance change is caused by a change in a geometry of the electrical transmission-line sensor.

6. The apparatus of claim 5, wherein:
   the applied load is at least one wheel of the moving vehicle.

7. The apparatus of claim 5, wherein:
   the information comprises any one of a wheel pressure and a wheel-sensor contact dimension,
   wherein:
   the wheel-sensor contact dimension comprises at least one of a width of the wheel-sensor contact, a location of the wheel-sensor contact along the electrical transmission-line sensor, and a wheel-sensor contact duration.

8. The apparatus of claim 5, wherein:
   the information comprises at least one of an axle detection, a vehicle presence detection, a single tire detection, a multi-tire detection, a wheel count, and an axle width.

9. The apparatus of claim 5, wherein:
   the information further comprises at least one of a wheel-road contact patch length, a weight of an individual wheel, a weight of the vehicle, and an inter-axle spacing.

10. The apparatus of claim 5 wherein:
    a data-processing system is configured to determine at least one of:
    the wheel-road contact patch length from the speed of the vehicle and the wheel-sensor contact duration;
    the weight of the individual wheel from the speed of the vehicle, a wheel pressure, a wheel-sensor contact width, and the wheel-sensor contact duration;

the weight of the moving vehicle from the weight of the individual wheels of the moving vehicle; or a wheel position or an axle position of the moving vehicle on a vehicular roadway from the location of the wheel-sensor contact along the electrical transmission-line sensor.

11. The apparatus of claim 5, wherein:
the electrical transmission-line sensor is any one of:
a controlled impedance transmission line;
a coaxial cable;
a twin-axial cable;
a stripline circuit; or
a microstrip circuit.

12. A method for measuring moving vehicle information, comprising:
   measuring a change in the impedance of an electrical transmission-line sensor as the electrical transmission-line sensor is loaded by a moving vehicle, using electrical time domain signal processing;
   converting the change in the impedance to a signal; and
   extracting the moving vehicle information from the signal by processing the signal;
   wherein:
   the change in the impedance is caused by a change in a geometry of the electrical transmission-line sensor caused by at least one wheel of the moving vehicle.

13. The method of claim 12, wherein:
the vehicle information comprises any one of a wheel pressure and a wheel-sensor contact dimension, wherein:
the wheel-sensor contact dimension comprises at least one of a width of the wheel-sensor contact, a location of the wheel-sensor contact along the electrical transmission-line sensor, and a wheel-sensor contact duration.

14. The method of claim 12, wherein:
the moving vehicle information comprises at least one of:
an axle detection,
a vehicle presence detection,
a single tire detection,
a multi-tire detection,
a wheel count,
an axle width,
a wheel-road contact patch length,
a weight of an individual wheel,
a weight of the moving vehicle,
and an inter-axle spacing.

15. The method of claim 12, further comprising at least one of:
   determining a wheel-road contact patch length from the speed of the vehicle and the wheel-sensor contact duration,
   determining a weight of the individual wheel from the speed of the vehicle, a wheel pressure, a wheel-sensor contact width, and a wheel-sensor contact duration,
   determining a weight of the moving vehicle from the weight of the individual wheels of the moving vehicle, or
   determining a wheel position or an axle position of the moving vehicle on a vehicular roadway from the location of the wheel-sensor contact along the electrical transmission-line sensor.

\* \* \* \* \*